United States Patent
Ando

(10) Patent No.: US 10,567,669 B2
(45) Date of Patent: Feb. 18, 2020

(54) DISPLAY APPARATUS AND CONTROL METHOD THEREOF

(71) Applicant: CANON KABUSHIKI KAISHA, Tokyo (JP)

(72) Inventor: Muneki Ando, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 15/947,922

(22) Filed: Apr. 9, 2018

(65) Prior Publication Data

US 2018/0302547 A1    Oct. 18, 2018

(30) Foreign Application Priority Data

Apr. 13, 2017  (JP) ................... 2017-079349

(51) Int. Cl.
   *H04N 5/235*    (2006.01)
(52) U.S. Cl.
   CPC ......... *H04N 5/2355* (2013.01); *H04N 5/2351* (2013.01); *H04N 5/2354* (2013.01)
(58) Field of Classification Search
   None
   See application file for complete search history.

(56) References Cited

U.S. PATENT DOCUMENTS

| 2018/0041801 A1* | 2/2018 | Owaki | G09G 5/10 |
| 2018/0139363 A1* | 5/2018 | Gal | H04N 1/58 |
| 2018/0152686 A1* | 5/2018 | Wozniak | H04N 7/15 |

FOREIGN PATENT DOCUMENTS

| JP | 05-167912 A | 7/1993 |
| JP | 2016-195379 A | 11/2016 |

* cited by examiner

*Primary Examiner* — Samira Monshi
(74) *Attorney, Agent, or Firm* — Cowan, Liebowitz & Latman, P.C.

(57) ABSTRACT

A display apparatus includes: an acquiring unit configured to acquire characteristic information on a correspondence relationship between a gradation value and image brightness of input image data; a converting unit configured to generate display image data by converting gradation values of the input image data based on the characteristic information and a predetermined correspondence relationship between a gradation value of the display image data and display brightness; and a displaying unit configured to display an image based on the display image data, wherein the converting unit converts the gradation values so that a linear characteristic is implemented in a first range, and a non-linear characteristic is implemented in a second range.

15 Claims, 18 Drawing Sheets

| ADJUSTMENT MENU | | |
|---|---|---|
| MAXIMUM DISPLAY BRIGHTNESS | ▲ 400 ▼ | 0~400 |
| KNEE POINT | ▲ 200 ▼ | 0~400 |
| CLIP POINT | ▲ 1200 ▼ | 0~1600 |

VISUAL INTERFERENCE BY BRIGHTNESS LEVEL DIFFERENCE

FIG. 13

| ADJUSTMENT MENU | |
|---|---|
| MAXIMUM DISPLAY BRIGHTNESS | ▲ 400 ▼ 0～400 |
| KNEE POINT | ▲ 200 ▼ 0～400 |
| CLIP POINT | ▲ 1200 ▼ 0～1600 |
| CURVE ADJUSTMENT VALUE | ▲ 1.0 ▼ 0.0～2.0 |

DISPLAY APPARATUS AND CONTROL METHOD THEREOF

BACKGROUND OF THE INVENTION

Field of the Invention

The present invention relates to a display apparatus and a control method thereof.

Description of the Related Art

A technique to generate image data in which the brightness dynamic range (range of data brightness, which is brightness of image data) is compressed by performing knee processing on image data acquired by an image pick up element has been proposed (Japanese Patent Application Publication No. H05-167912). With this technique, an overexposure in a high brightness portion (high brightness image region) of the image data, captured by a video camera, can be controlled. The data brightness is also regarded as "brightness assumed in image data".

Further, a technique to generate and output high dynamic range (HDR) image data in which the brightness dynamic range is wide, and standard dynamic range (SDR) image data in which the brightness dynamic range of the HDR image data is compressed has been proposed (Japanese Patent Application Publication No. 2016-195379). With this technique, the image data, captured by a video camera which can capture HDR image data, can be monitored using a display apparatus of which brightness dynamic range (range of display brightness on screen) is narrow.

SUMMARY OF THE INVENTION

For example, a video camera can capture HDR image data having a brightness dynamic range of at least 0% and not more than 1600%. When the HDR image data is displayed, the display brightness is adjusted so that the data brightness 100% becomes the display brightness 100 cd/m$^2$.

At a capturing location, there is a need to check overexposure or underexposure of the recording target image data. To check overexposure or underexposure, a signal waveform is checked using a waveform monitor, and an image displayed on the display apparatus is checked (monitored). In concrete terms, a waveform monitor is used to recognize the overexposure or underexposure phenomena, and a display apparatus is used to subjectively recognize an image expressed by the image data.

At a capturing location, the display apparatus for monitoring can implement the display brightness up to only about 400 cd/m$^2$ for such reasons as the demand for minimizing the size and weight of the apparatus, and a power supply that can be used at the capturing location. Under such conditions, in some cases the HDR image data may not be appropriately displayed, and the HDR image data may not be appropriately monitored.

First a method of displaying the display brightness, so that the data brightness 100% becomes the display brightness 100 cd/m$^2$, is considered. In the case of this method, the highlight portion (high brightness portion) of the HDR image data is displayed with overexposure, hence it is difficult to determine whether the overexposed portion is included in the HDR image, or to determine whether overexposure is caused by adjusting the display brightness.

A method of adjusting the display brightness, so that the upper limit of the data brightness becomes the upper limit of the display brightness, is considered next. In the case of this method, generally the HDR image data is displayed dark. For example, the image region in which data brightness is 100% is displayed at the display brightness 25 cd/m$^2$. Therefore it is difficult to determine whether underexposure is generated, or whether the brightness of the displayed image is as the user intended.

A method of compressing the brightness dynamic range in the highlight portion of the HDR image data using the knee function of the video camera is considered next. In the case of this method, an SDR image data, which is compressed image data, is not always displayed at the brightness that is expected in this SDR image data. Therefore it is difficult to determine the brightness of the HDR image data.

The present invention in its first aspect provides a display apparatus, comprising:

an acquiring unit configured to acquire characteristic information on a correspondence relationship between a gradation value of input image data and image brightness which is brightness of the input image data;

a converting unit configured to generate display image data by converting each gradation value of the input image data based on the characteristic information and a predetermined correspondence relationship between a gradation value of the display image data and display brightness on a screen; and a displaying unit configured to display an image based on the display image data on the screen, wherein the converting unit converts each gradation value of the input image data so that in a first range which is a range in which image brightness is not more than a first brightness, a linear characteristic, in which the display brightness increases approximately linearly with the increase of the image brightness, is implemented, and in a second range which is a range in which image brightness is not less than the first brightness, a non-linear characteristic, in which the display brightness increases up to an upper limit with the increase of the image brightness more gently than in the linear characteristic in the first range, is implemented.

The present invention in its second aspect provides a control method of display apparatus configured to display an image based on display image data on a screen, the control method comprising:

acquiring characteristic information on a correspondence relationship between a gradation value of input image data and image brightness which is brightness of the input image data; and generating the display image data by converting each gradation value of the input image data based on the characteristic information and a predetermined correspondence relationship between a gradation value of the display image data and display brightness on the screen, wherein in the generating, each gradation value of the input image data is converted so that in a first range which is a range in which image brightness is not more than a first brightness, a linear characteristic, in which the display brightness increases approximately linearly with the increase of the image brightness, is implemented, and in a second range which is a range in which image brightness is not less than the first brightness, a non-linear characteristic, in which the display brightness increases up to an upper limit with the increase of the image brightness more gently than in the linear characteristic in the first range, is implemented.

The present invention in its third aspect provides an image processing apparatus, comprising:

an acquiring unit configured to acquire characteristic information on a correspondence relationship between a gradation value of input image data and image brightness which is brightness of the input image data; and a converting unit configured to generate display image data by converting each gradation value of the input image data based on the characteristic information and a predetermined correspondence relationship between a gradation value of the display image data and display brightness on a screen, wherein the converting unit converts each gradation value of the input image data so that in a first range which is a range in which image brightness is not more than a first brightness, a linear characteristic, in which the display brightness increases approximately linearly with the increase of the image brightness, is implemented, and in a second range which is a range in which image brightness is not less than the first brightness, a non-linear characteristic, in which the display brightness increases up to an upper limit with the increase of the image brightness more gently than in the linear characteristic in the first range, is implemented.

Further features of the present invention will become apparent from the following description of exemplary embodiments with reference to the attached drawings.

BRIEF DESCRIPTION OF THE DRAWINGS

FIG. 13 is an example of an adjustment menu according to Example 2;

DESCRIPTION OF THE EMBODIMENTS

Example 1

Example 1 of the present invention will be described.

Figure 1:
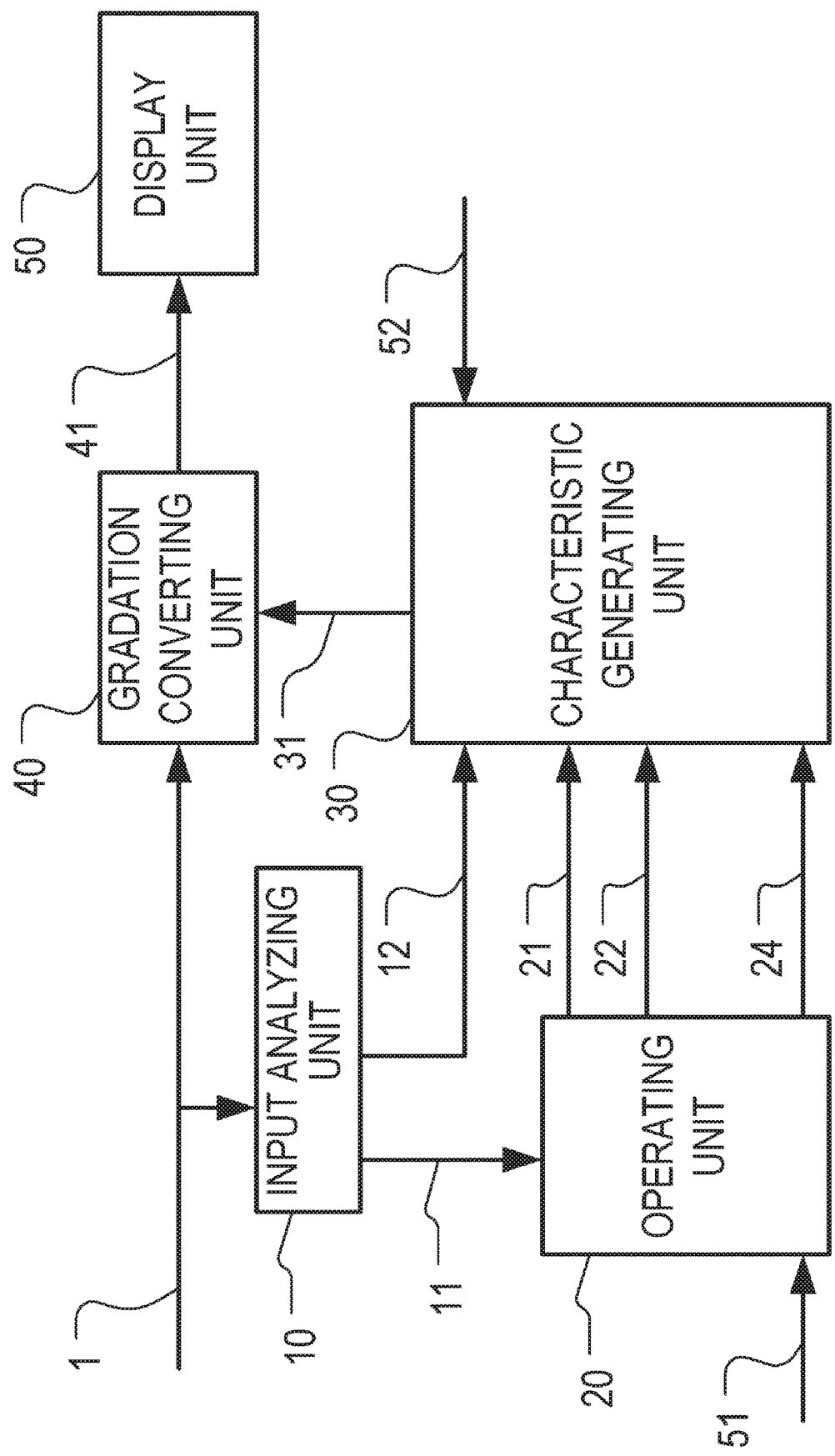
FIG. 1 is a block diagram depicting a configuration example of a display apparatus according to Example 1.

FIG. 1 is a block diagram depicting a configuration example of a display apparatus according to this example.

The display apparatus according to this example is a liquid crystal display apparatus, an organic Electro Luminescence (EL) display apparatus, a plasma display apparatus, a Micro Electro Mechanical System (MEMS) shutter type display apparatus or the like.

An input analyzing unit 10 acquires input dynamic range information 11 and input characteristic information 12 of input image data 1 which is input to an input unit (input terminal) (not illustrated), outputs the input dynamic range information 11 to an operating unit 20, and outputs the input characteristic information 12 to a characteristic generating unit 30. The input dynamic range information 11 is information on a brightness dynamic range of the input image data 1 (range of data brightness, which is brightness of the input image data 1). For example, the input dynamic range information 11 is information which indicates the brightness dynamic range of the input image data 1, an identifier to identify the brightness dynamic range of the input image data 1 and the like. The input characteristic information 12 is information on an input gradation characteristic (correspondence relationship between the gradation value of the input image data 1 and the data brightness of the input image data 1). For example, the input characteristic information 12 is a function to indicate the input gradation characteristic, a table to indicate the input gradation characteristic, an identifier to identify the input gradation characteristic and the like. The data brightness of the input image data 1 is also regarded as "image brightness that is assumed in the input image data 1".

In this example, the input analyzing unit 10 analyzes the meta data of the input image data 1 (format information included in the meta data), and acquires the input dynamic range information 11 and the input characteristic information 12 from the meta data. In some cases, the meta data may be unable to be acquired from the input image data 1, or information (at least one of the input dynamic range information 11 and the input characteristic information 12) may be unable to be acquired from the meta data. In this case, the input analyzing unit 10 acquires information (at least one of the input dynamic range information 11 and the input characteristic information 12) in accordance with the user operation of the display apparatus. For example, the input analyzing unit 10 acquires information which the user specified using the user interface (not illustrated).

Figures 2, 3:
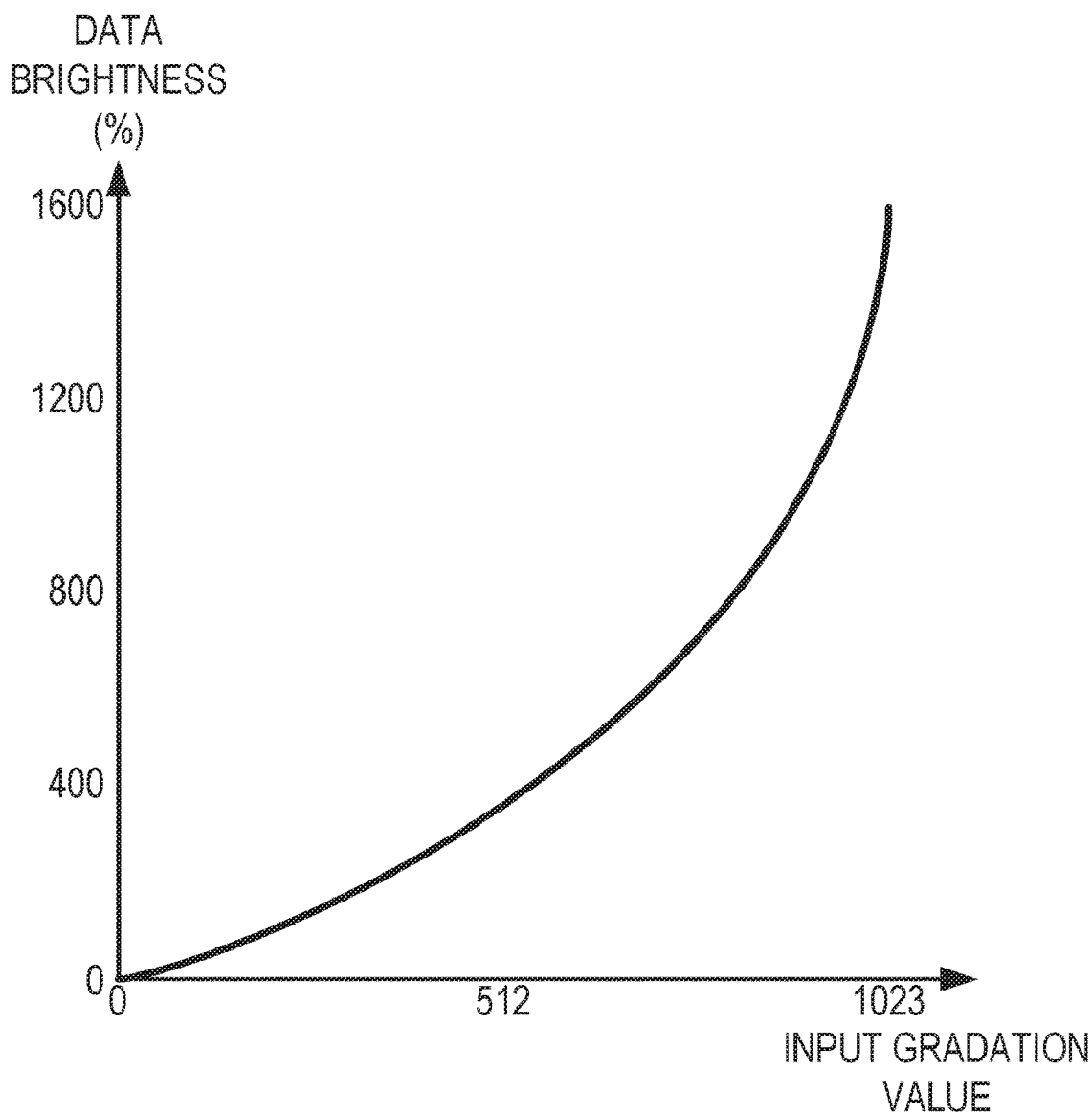
FIG. 2 is an example of an input gradation characteristic according to Example 1.
FIG. 3 is an example of an adjustment menu according to Example 1.

In this example, the input gradation value (gradation value of the input image data 1) is a binary data corresponding to a value that is at least 0 and not more than 1023. The input analyzing unit 10 acquires an electro-optical transfer function (EOTF), which indicates the input gradation characteristic (correspondence relationship between the input gradation value and data brightness) as the input characteristic information 12. FIG. 2 is an example of the input gradation characteristic (EOTF). In this example, as shown in FIG. 2, the relative brightness (%) when a predetermined brightness of white is 100% is used as the data brightness. As the input gradation value increases from 0 to 1023, the data brightness increases from 0% to 1600%. In this example, the data brightness P % is handled as the absolute brightness P cd/m$^2$.

The format, the acquisition method and the like of the input dynamic range information 11 and the input characteristic information 12 are not especially limited. For example, the brightness dynamic range of the input image data 1 may be determined based on the input characteristic information 12, and the input dynamic range information 11 may be generated based on the determined brightness dynamic range. The range, the format and the like of the input gradation value and the data brightness are not especially limited respectively. For example, the range of the input gradation value may be larger or smaller than the range of at least 0 and not more than 1023. The range of the data brightness may be larger or smaller than the range of at least 0% and not more than 1600%. An absolute brightness that is different from P cd/m² may be regarded as the absolute brightness corresponding to the data brightness P %. An absolute brightness (cd/m²) may be used as the data brightness.

The operating unit 20 accepts the user operation for the display apparatus (e.g. operation to specify various values using a user interface (not illustrated)). In this example, the operating unit 20 acquires, from a non-volatile memory (not illustrated), information on a maximum apparatus brightness 51, which is the maximum display brightness (original upper limit; predetermined brightness) that can be set as the upper limit of the display brightness (display brightness on the screen of the display apparatus). The operating unit 20 performs control to display an adjustment menu, as shown in FIG. 3, based on the maximum apparatus brightness 51 and the input dynamic range information 11. Then the operating unit 20 accepts the user operation using the adjustment menu. The user can specify a clip point 21, a knee point 22 and a maximum display brightness 24 respectively using the adjustment menu. In this example, the maximum apparatus brightness 51 is the upper limit of the maximum display brightness 24. The operating unit 20 sets the clip point 21, the knee point 22 and the maximum display brightness 24, which are specified by the user, in a characteristic generating unit 30.

The characteristic generating unit 30 acquires display characteristic information 52 from a non-volatile memory (not illustrated), and generates gradation conversion table data 31 based on the input characteristic information 12, the clip point 21, the knee point 22, the maximum display brightness 24 and the display characteristic information 52. Then the characteristic generating unit 30 outputs the gradation conversion table data 31 to a gradation converting unit 40. The display characteristic information 52 is information on the display gradation characteristic (later mentioned predetermined correspondence relationship between the gradation value of the display image data 41 and the display brightness). For example, the display characteristic information 52 is a function to indicate the display gradation characteristic, a table to indicate the display gradation characteristic, or an identifier to identify the display gradation characteristic. The gradation conversion table data 31 is a table data that is used as a parameter to convert each gradation value of the input image data 1, and is, for example, a lookup table (LUT) to which the gradation value before conversion is input, and from which the gradation value after the conversion is output. The method of generating the gradation conversion table data 31 will be described later. The parameter is not limited to the table data. For example, the parameter may be a function which indicates the conversion characteristic (correspondence relationship between the gradation value before the conversion and the gradation value after the conversion).

Figure 5:
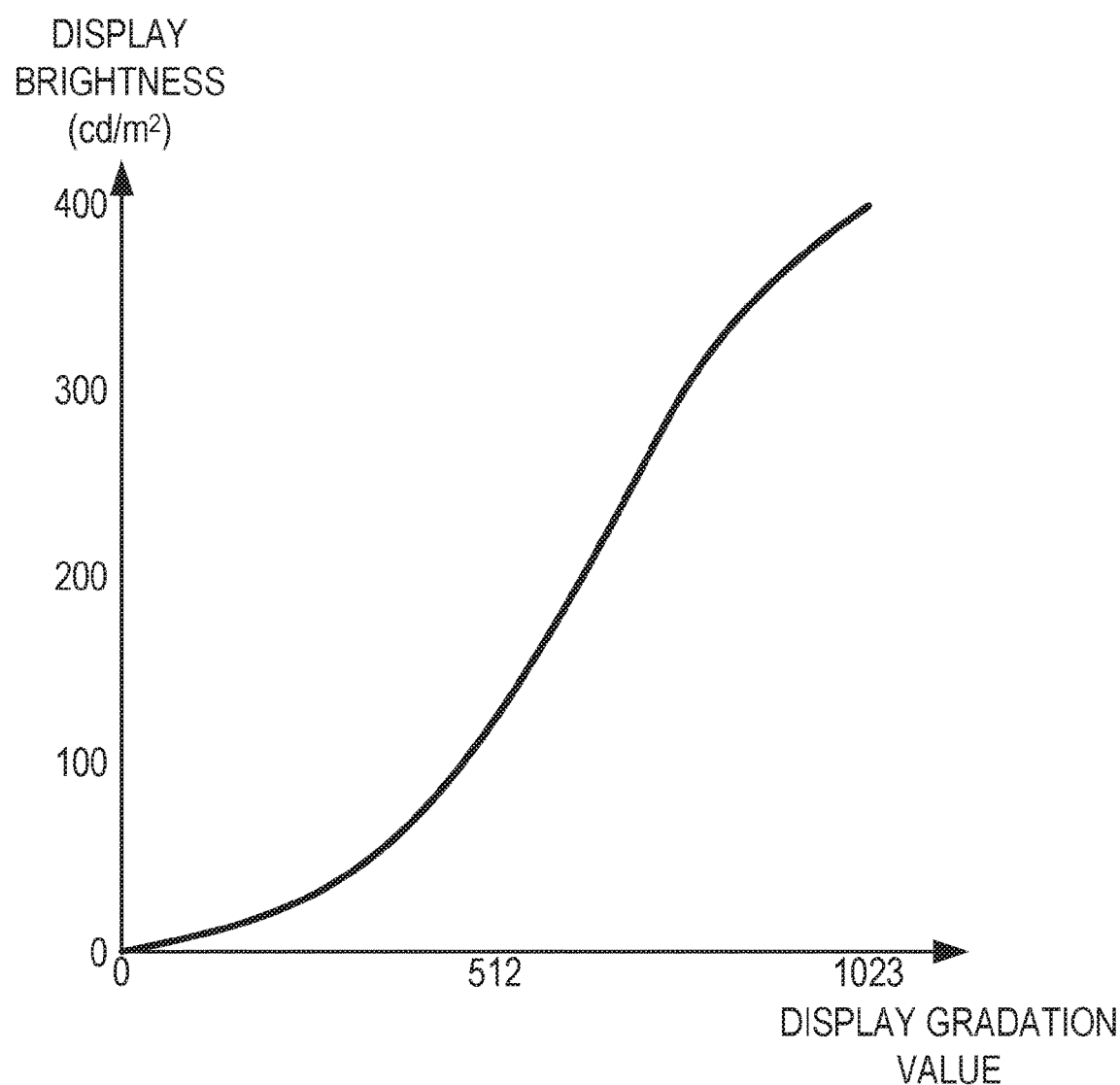
FIG. 5 is an example of a display gradation characteristic according to Example 1.

In this example, the display gradation value (gradation value of the display image data 41) is also a binary data corresponding to a value of at least 0 and not more than 1023. Then the characteristic generating unit 30 acquires a table which indicates the display gradation characteristic (a predetermined correspondence relationship between the display gradation value and the display brightness) as the display characteristic information 52. FIG. 5 is an example of the display gradation characteristic. The display gradation characteristic in FIG. 5 is a case when the maximum apparatus brightness 51 is 400 cd/m². In the display gradation characteristic in FIG. 5, the display brightness increases from 0 cd/m² to 400 cd/m² when the display gradation value increases from 0 to 1023.

The maximum apparatus brightness 51 may be higher or lower than 400 cd/m². The lower limit of the display brightness may be higher than 0 cd/m². The format of the display characteristic information 52 is not especially limited. The range, the format and the like of the display gradation value is not especially limited. For example, the range of the display gradation value may be larger or smaller than the range of at least 0 and not more than 1023.

The gradation converting unit 40 converts each gradation value of the input image data 1 in accordance with the gradation conversion table data 31, whereby the display image data 41 is generated. Then the gradation converting unit 40 outputs the display image data 41 to the displaying unit 50.

A displaying unit 50 displays an image based on the display image data 41 on the screen.

Figure 4A:
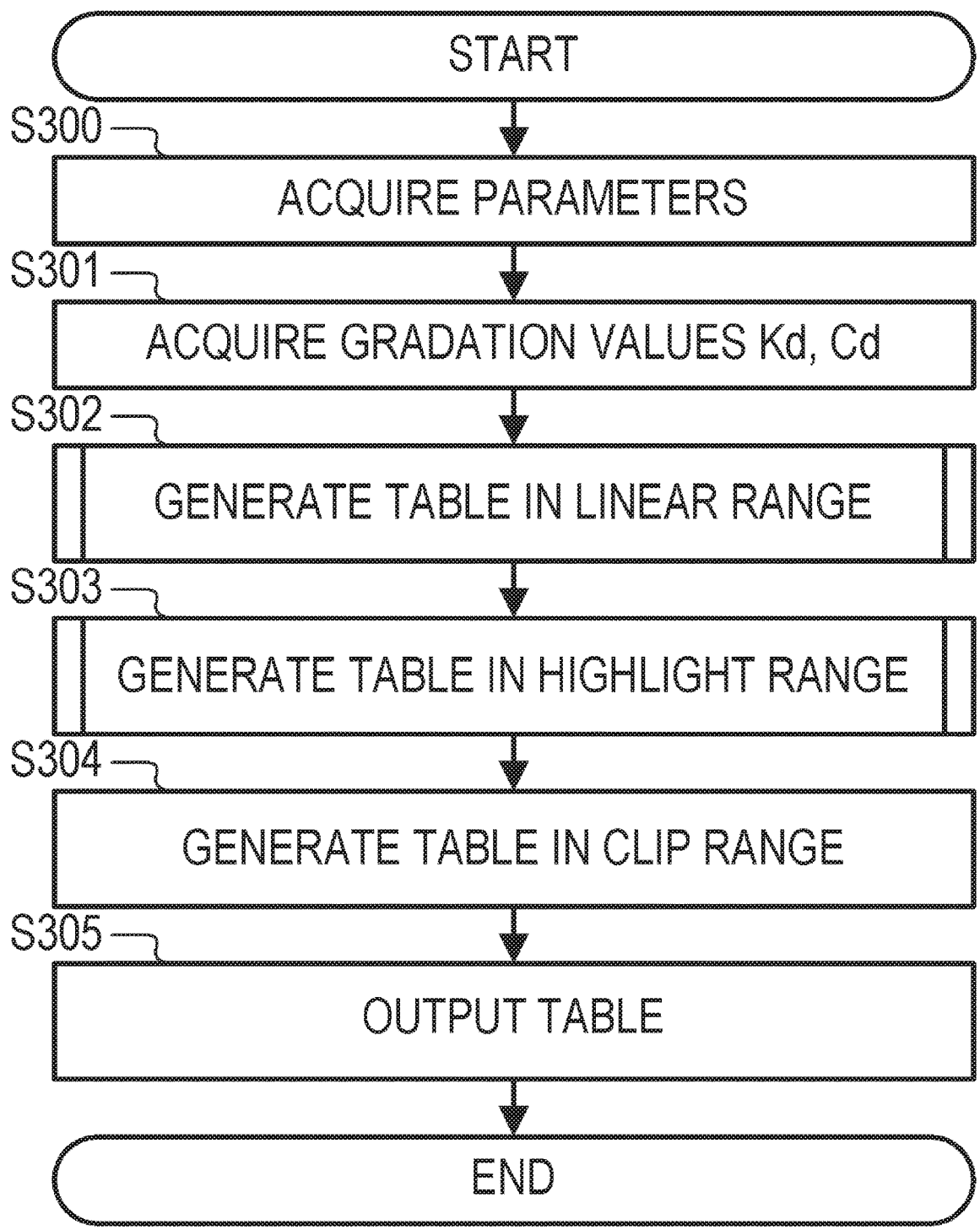
FIG. 4A to 4C are flow charts depicting an example of a processing flow according to Example 1.

FIG. 4A is a flow chart depicting an example of the method of generating the gradation conversion table data 31.

First in S300, the characteristic generating unit 30 acquires brightness C at the clip point 21, brightness K at the knee point 22, and brightness DL at the maximum display brightness 24, from the operating unit 20. The characteristic generating unit 30 acquires a table EOTF (x1), which is the input characteristic information 12, from the input analyzing unit 10, and acquires a table DTF (x2), which is the display characteristic information 52, from the non-volatile memory (not illustrated). The table EOTF (x1) is a table in which the input gradation value (gradation value of the input image data 1) x1 is the input value, and the data brightness EOTF (x1) is the output value. The table DTF (x2) is a table in which the display brightness x2 is the input value, and the display gradation value (gradation value of the display image data 41) DTF (x2) is the output value.

Then in S301, the characteristic generating unit 30 converts the brightness K into an input gradation value Kd corresponding to the knee point 22 based on the input characteristic information 12. In the same manner, the characteristic generating unit 30 converts the brightness C into the input gradation value Cd corresponding to the clip point 21 based on the input characteristic information 12. In concrete terms, the characteristic generating unit 30 acquires the input gradation values Kd and Cd by reverse lookup using the table EOTF (x1), as shown in the following Expressions 1-1 and 1-2. In Expressions 1-1 and 1-2, "EOTF$^{-1}$(y)" is a table in which the input value and the output value of the EOTF (x1) are replaced, so that the brightness (data brightness) y is the input value, and the input gradation value EOTF$^{-1}$(y) is the output value.

$$Kd = \text{EOTF}^{-1}(K) \qquad \text{(Expression 1-1)}$$

$$Cd = \text{EOTF}^{-1}(C) \qquad \text{(Expression 1-2)}$$

Then in S302, the characteristic generating unit 30 generates gradation conversion table data 31 in a linear range. The linear range is a range in which the data brightness is not more than the brightness K (not more than the brightness at the clip point). The linear range can be regarded as "a range of the input gradation values that are not more than the input gradation value Kd". The method of generating the gradation conversion table data 31 in the linear range will be described later.

Then in S303, the characteristic generating unit 30 generates the gradation conversion table data 31 in a highlight range. The highlight range is a range in which the data brightness is at least the brightness K and not more than the brightness C. The highlight range can be regarded as "a range of the input gradation values that are at least the input gradation value Kd and not more than the input gradation value Cd". The method of generating the gradation conversion table data 31 in the highlight range will be described later.

Then in S304, the characteristic generating unit 30 generates the gradation conversion table data 31 in a clip range. The clip range is a range in which the data brightness is at least the brightness C and not more than the upper limit of the data brightness. The clip range can be regarded as "a range of the input gradation values that are at least the input gradation value Cd and not more than the upper limit Dmax of the input gradation value". In this example, the characteristic generating unit 30 generates the gradation conversion table data 31 in the clip range, so as to implement the characteristic, in which the brightness DL (maximum display brightness 24; upper limit of the display brightness) corresponds to each data brightness in the clip range. In concrete terms, the characteristic generating unit 30 acquires a display gradation value LUT (I) corresponding to each input gradation value I, which is at least the input gradation value Cd and not more than the upper limit Dmax of the input gradation value, from the display characteristic information 52 (table DTF (x2)) and the brightness DL, as shown in the following Expression 2. Thereby the gradation conversion table data 31 in the clip range is generated. The sequence of the processing in S302 to S304 is not especially limited.

$$\text{LUT}(I) = \text{DTF}(DL) \quad \text{(Expression 2)}$$

Then in S305, the characteristic generating unit 30 outputs the gradation conversion table data 31, generated by the processing in S302 to S304, to the gradation converting unit 40. The three gradation conversion table data 31 generated by the processing in S302 to S304 may be output, or one gradation conversion table data constituted by the three gradation conversion table data 31 may be output.

Figure 4B:
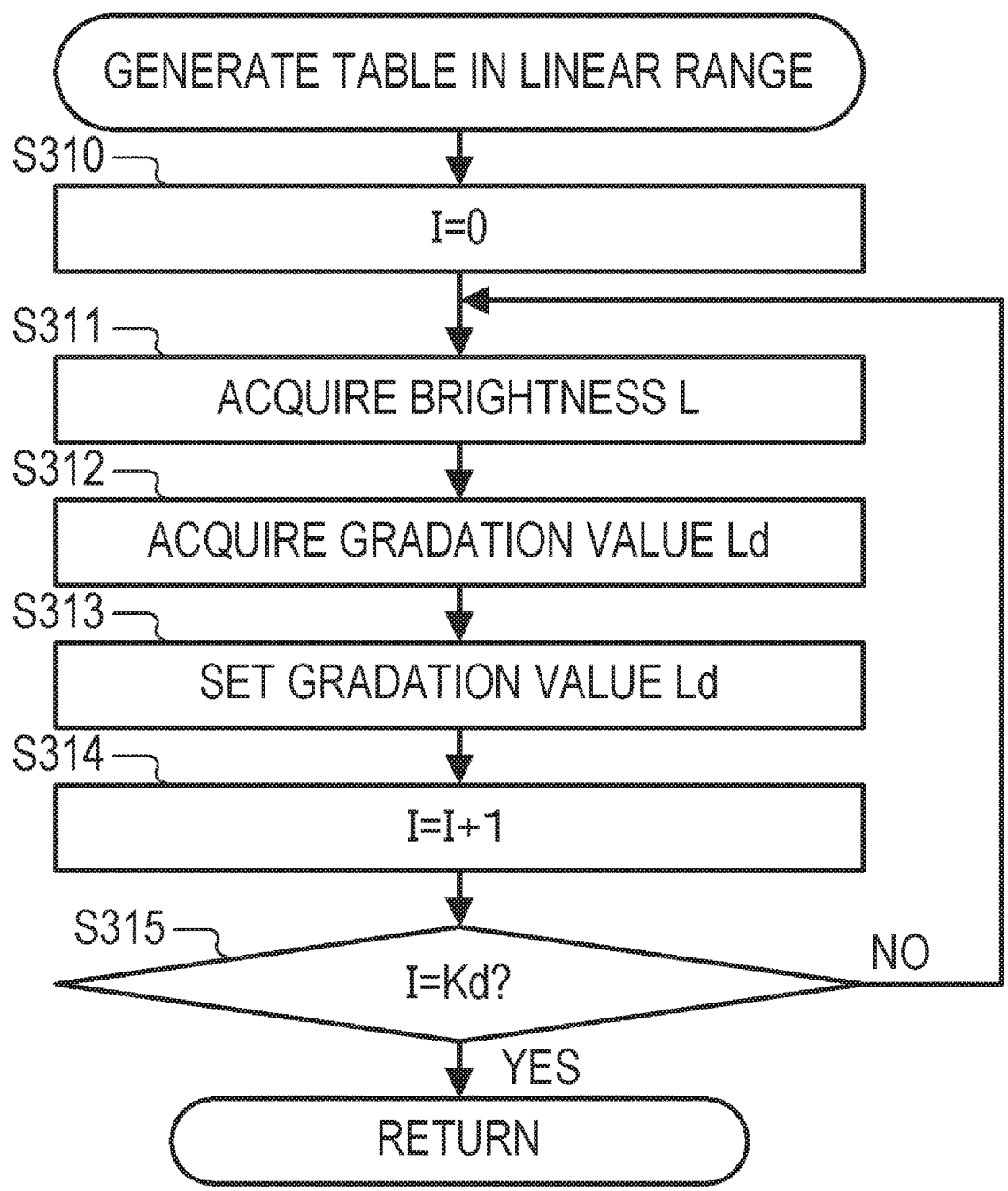

FIG. 4B is a flow chart depicting an example of the method of generating the gradation conversion table data 31 in the linear range (S302).

First in S310, the characteristic generating unit 30 initializes the loop variable I to 0.

Then in S311, the characteristic generating unit 30 acquires data brightness L corresponding to the input gradation value I based on the input characteristic information 12 (table EOTF (x1)), as shown in the following Expression 3.

$$L = \text{EOTF}(I) \quad \text{(Expression 3)}$$

Then in S312, the characteristic generating unit 30 acquires the display gradation value Ld corresponding to the data brightness (display brightness) L based on the display characteristic information 52 (Table DTF (x2)), as shown in the following Expression 4.

$$Ld = \text{DTF}(L) \quad \text{(Expression 4)}$$

Then in S313, the characteristic generating unit 30 sets (describes) the display gradation value Ld in the gradation conversion table data 31. In concrete terms, the characteristic generating unit 30 sets the display gradation value Ld as the display gradation value LUT (I) corresponding to the input gradation value I, as shown in the following Expression 5.

$$\text{LUT}(I) = Ld \quad \text{(Expression 5)}$$

Then in S314, the characteristic generating unit 30 updates the loop variable I to I=I+1.

Then in S315, the characteristic generating unit 30 determines whether or not the loop variable I=Kd. If the loop variable I=Kd, a processing flow (sub-routine) in FIG. 4B ends, and if not, the processing returns to S311. Instead of determining whether or not the loop variable I=Kd, whether or not the data brightness EOTF (I)=K may be determined.

According to the flow chart in FIG. 4B, the gradation conversion table data 31 can be generated so that the linear characteristic, in which the display brightness increases approximately linearly with the increase of the data brightness, is implemented in the linear range ("approximately" includes "exactly"). In concrete terms, the gradation conversion table data 31 can be generated so that the linear characteristic in the linear range becomes a characteristic in which the data brightness is approximately the same as the display brightness corresponding to this data brightness. The method of generating the gradation conversion table data 31 is not limited to the above method, as long as the linear characteristic is implemented in the linear range. For example, in the linear characteristic in the linear range, the data brightness may be different from the display brightness corresponding to the data brightness.

Figure 4C:
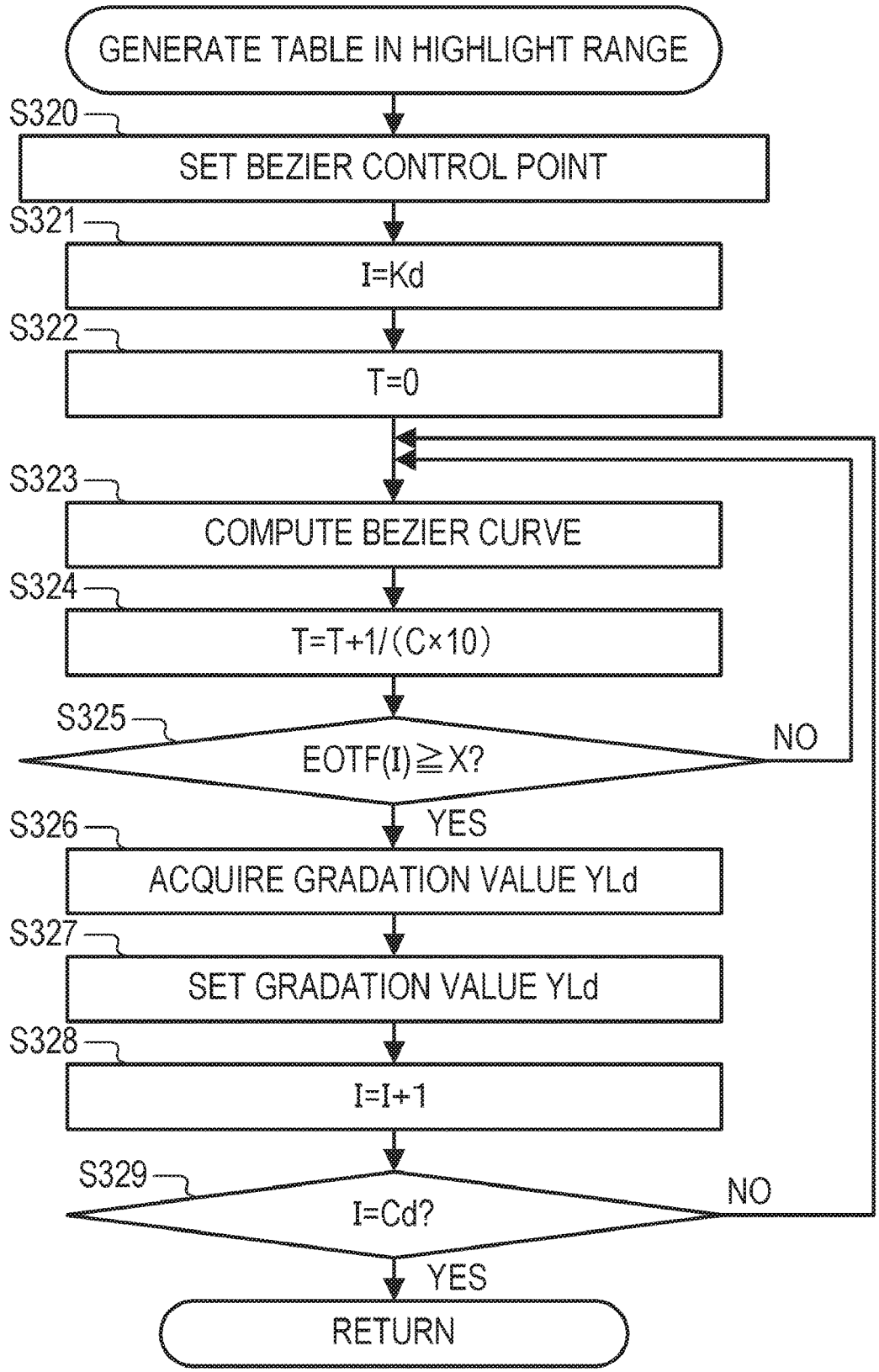

FIG. 4C is a flow chart depicting an example of the method of generating the gradation conversion table data 31 in the highlight range (S303).

First in S320, the characteristic generating unit 30 sets Bezier control points (data brightness, display brightness), which are control points (reference points) to generate a Bezier curve to indicate the correspondence relationship between the data brightness and the display brightness. In this example, the following four Bezier control points are set.

First Bezier control point (Xa, Ya)=(K, K)
Second Bezier control point (Xb, Yb)=(K+(DL−K)/2, Xb)
Third Bezier control point (Xc, Yc)=(C, DL)
Fourth Bezier control point (Xd, Yd)=(C, DL)

Then in S321, the characteristic generating unit 30 initializes the loop variable I to Kd.

Then in S322, the characteristic generating unit 30 initializes a parameter T to generate the Bezier curve to 0.

Then in S323, the characteristic generating unit 30 performs computing to generate the Bezier curve. In concrete terms, the characteristic generating unit 30 calculates a point (data brightness, display brightness)=(X, Y) which is located on the Bezier curve and corresponds to the parameter T, using the following Expressions 6-1 and 6-2. In this example, the point (X, Y) is used as the point corresponding to the input gradation value (loop variable) I.

$$X = Xa \times (1-T)^3 + Xb \times T \times (1-T)^2 + Xc \times T^2 \times (1-T) + Xd \times T^3 \quad \text{(Expression 6-1)}$$

$$Y = Ya \times (1-T)^3 + Yb \times T \times (1-T)^2 + Yc \times T^2 \times (1-T) + Yd \times T^3 \quad \text{(Expression 6-2)}$$

Then in S323, the characteristic generating unit 30 updates the parameter T. In this example, the characteristic generating unit 30 updates the parameter T to T=T+1/(C× 10). "1/(C×10)" is a step width of the parameter T. As the step width increases, the accuracy of generating the gradation conversion table data 31 decreases, hence it is preferable that the step width is not more than 1/(C×2).

Then in S323, the characteristic generating unit 30 determines whether the data brightness X satisfies a predetermined condition. In this example, the characteristic generating unit 30 determines whether the data brightness X is at least the data brightness corresponding to the input gradation value I. In other words, the characteristic generating unit 30 determines whether the following Expression 7 is satisfied. If Expression 7 is satisfied, the processing advances to S324. If not, the processing returns to S323, and the point (X, Y) corresponding to the input gradation value I is updated.

$$EOTF(I) \geq X \qquad \text{(Expression 7)}$$

Then in S324, based on the display brightness Y corresponding to the input gradation value I and the display characteristic information 52 (table DTF (x2)), the characteristic generating unit 30 acquires the display gradation value YLd corresponding to this display brightness Y, as shown in the following Expression 8.

$$YLd = DTF(Y) \qquad \text{(Expression 8)}$$

Then in S325, the characteristic generating unit 30 sets the display gradation value YLd in the gradation conversion table data 31. In concrete terms, the characteristic generating unit 30 sets the display gradation value Ld as the display gradation value LUT (I) corresponding to the input gradation value I, as shown in the following Expression 9.

$$LUT(I) = YLd \qquad \text{(Expression 9)}$$

Then in S326, the characteristic generating unit 30 updates the loop variable I to I=I+1.

Then in S327, the characteristic generating unit 30 determines whether or not the loop variable I=Cd. If the loop variable I=Cd, a processing flow (sub-routine) in FIG. 4C ends, and if not, the processing returns to S323. Instead of determining whether or not the loop variable I=Cd, it may be determined whether or not the data brightness EOTF (I)=C.

According to the flow chart in FIG. 4C, the gradation conversion table data 31 can be generated so that the non-linear characteristic, in which the display brightness increases up to the brightness DL with the increase of the data brightness more gently than in the linear characteristic in the linear range, is implemented in the highlight range. This characteristic of the highlight range can be regarded as "a characteristic in which the characteristic similar to the linear characteristic in the linear range is compressed in gradation". The method of generating the gradation conversion table data 31 is not limited to the above method as long as the non-linear characteristic, in which the display brightness increases up to the brightness DL with the increase of the data brightness more gently than in the linear characteristic in the linear range, can be implemented in the highlight range. For example, as the second Bezier control point (Xb, Yb), another point which is on a line passing through the first Bezier control point (Xa, Ya) and the point (DL, DL) and is between these two points, may be used. As the third Bezier control point (Xc, Yc), another point, which is on a line passing through the point (DL, DL) and the fourth Bezier control point (Xd, Yd) and is between these two points, may be used.

In this example, the gradation conversion table data 31 is generated so as to satisfy the following Conditions 1 to 4. Thereby a natural and beautiful image, without a brightness level difference, can be displayed. A part of Conditions 1 to 4 need not be satisfied. For example, Condition 2 need not be satisfied, or Conditions 1 and 2 need not be satisfied.

Condition 1: The characteristic of the highlight range is continuous to the characteristic of the linear range.

Condition 2: A first derivation (derived function) of the characteristic of the highlight range is continuous to the first derivation of the characteristic of the linear range.

Condition 3: The display brightness increases with the increase of the data brightness (a monotonic increase) in the linear range and the highlight range respectively.

Condition 4: In the highlight range, an increase of the display brightness with the increase of the data brightness is gentle, compared with the characteristic of the linear range.

Figure 6:
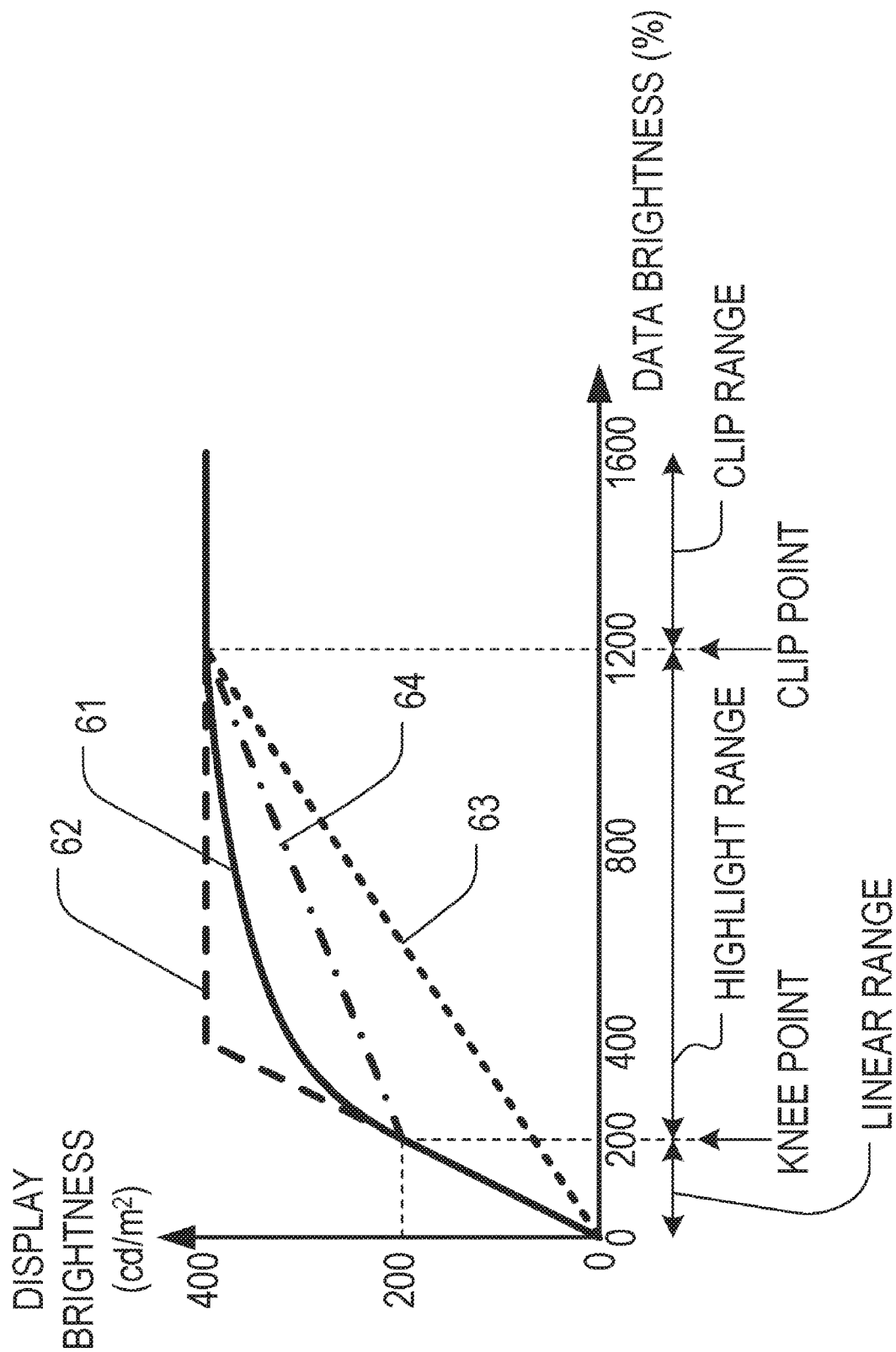
FIG. 6 is an example of a brightness characteristic according to Example 1.

A concrete example of the effect obtained by this example will be described. In this example, it is assumed that the clip point 21 (brightness C) is 1200%, the knee point 22 (brightness K) is 200%, and the maximum display brightness 24 (brightness DL) is 400 cd/m$^2$. In this case, the brightness characteristic 61 in FIG. 6 is implemented as the brightness characteristic with respect to the correspondence relationship between the data brightness and the display brightness.

In this example, a range of the data brightness that is at least 0% (black point) and not more than 200% (knee point) is set as the linear range. Then, similarly to the brightness characteristic 61, the display brightness linearly increases from 0 cd/m$^2$ to 200 cd/m$^2$ with slope=1 in the linear range, when the data brightness increases from 0% to 200%. High dynamic range (HDR) image data, in which the dynamic range of the data brightness is large, is often performed with an exposure setting such that the data brightness of a major portion of the object becomes not more than about 200%. Therefore in many case, most of the image represented by the input image data 1 is displayed with the brightness characteristic of the linear range. As a result, the intention of the input image data 1 (capturing intention; creation intention) of the input image data, in terms of underexposure of the display image (displayed image), gradation of the low to intermediate brightness portion of the display image, general brightness of the display image and the like, can be accurately reproduced.

Figure 7A:
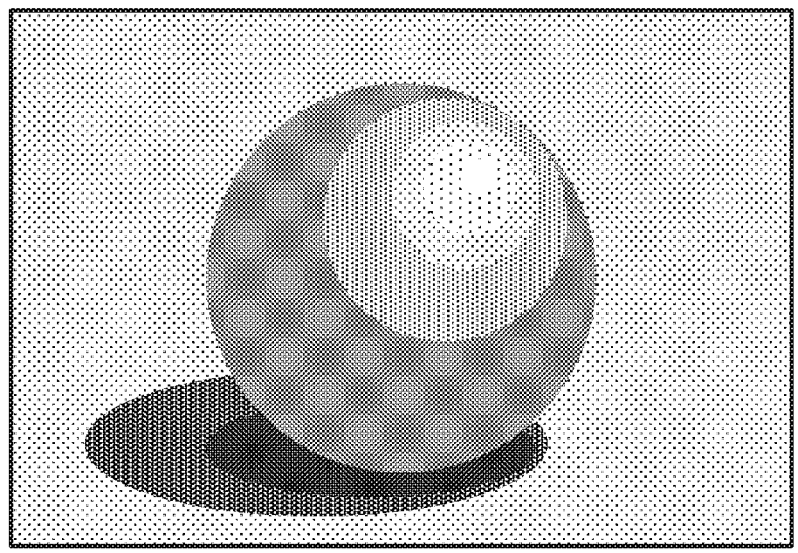
FIG. 7A to 7D are examples of display images according to Example 1.

Further, in this example, the range of the data brightness that is at least 200% (knee point) and not more than 1200% (clip point) is set as the highlight range. Then, similarly to the brightness characteristic 61, the display brightness increases from 200 cd/m$^2$ to 400 cd/m$^2$ with the increase of the data brightness from 200% to 1200% more gently in the highlight range (compression characteristic) than the brightness characteristic of the linear range. Thereby for the highlight portion (high brightness portion) of the display image, the generation of overexposure in the input image data 1, gradation of the input image data 1 and the like can be easily (and generally) determined based on the display image. By using the brightness characteristic 61, the image in FIG. 7A, for example, can be displayed.

Figure 7B:
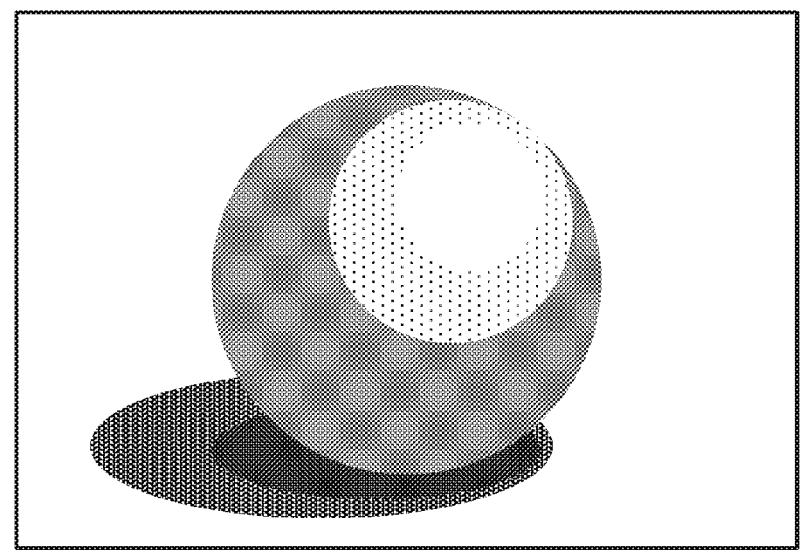

Here, as a comparative example, a brightness characteristic 62, in which the display brightness is clipped at the maximum display brightness 400 cd/m$^2$ without generating a knee curve (knee characteristic), will be considered. If the brightness characteristic 62 is used, an image illustrated in FIG. 7B is displayed, for example. In this case as well, the intention of the input image data 1 in terms of the underexposure of the display image, gradation of the low to intermediate brightness portion of the display image, general brightness of the display image and the like, can be accurately reproduced. However, the highlight portion of the input image data 1 is displayed in an overexposure state, hence for the highlight portion of the display image, the generation of overexposure in the input image data 1, gradation of the input image data 1 and the like, cannot be easily determined based on the display image.

Figure 7C:
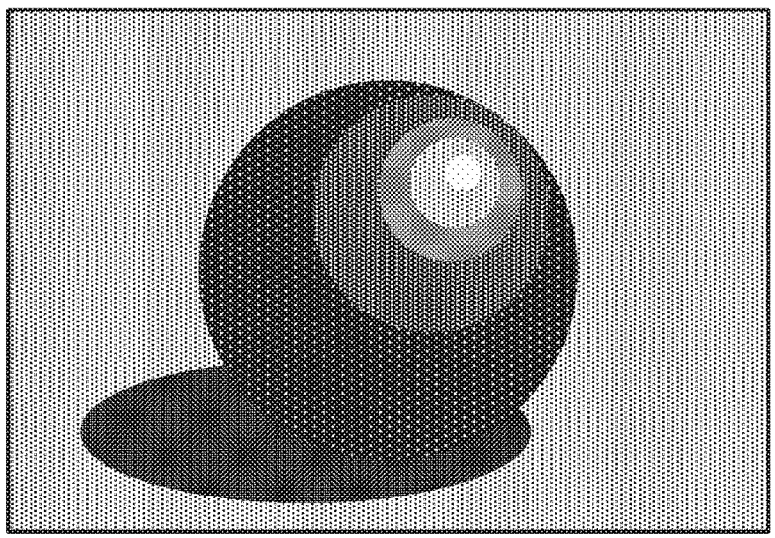

As another comparative example, a brightness characteristic 63, in which the display brightness linearly increases from 0 cd/m² to 400 cd/m² as the data brightness increases from 0% (black point) to 1200% (clip point) will be considered. If the brightness characteristic 63 is used, an image illustrated in FIG. 7C is displayed, for example. In this case as well, the generation of overexposure in the input image data 1, gradation of the input image data l and the like, can be easily determined based on the display image. However, in general the input image data 1 is displayed dark, hence the generation of underexposure in the input image data 1, gradation of the input image data 1 in the low to intermediate brightness portion, general brightness of the input image data 1 and the like, cannot be easily determined based on the display image. In this example, the slope of the linear range (slope of the change of the display brightness with respect to the change of the data brightness) is large. Therefore the generation of underexposure in the input image data 1, gradation of the input image data 1 in the low to intermediate brightness portion, general brightness of the input image data 1 and the like, can be easily determined based on the display image.

Figure 7D:
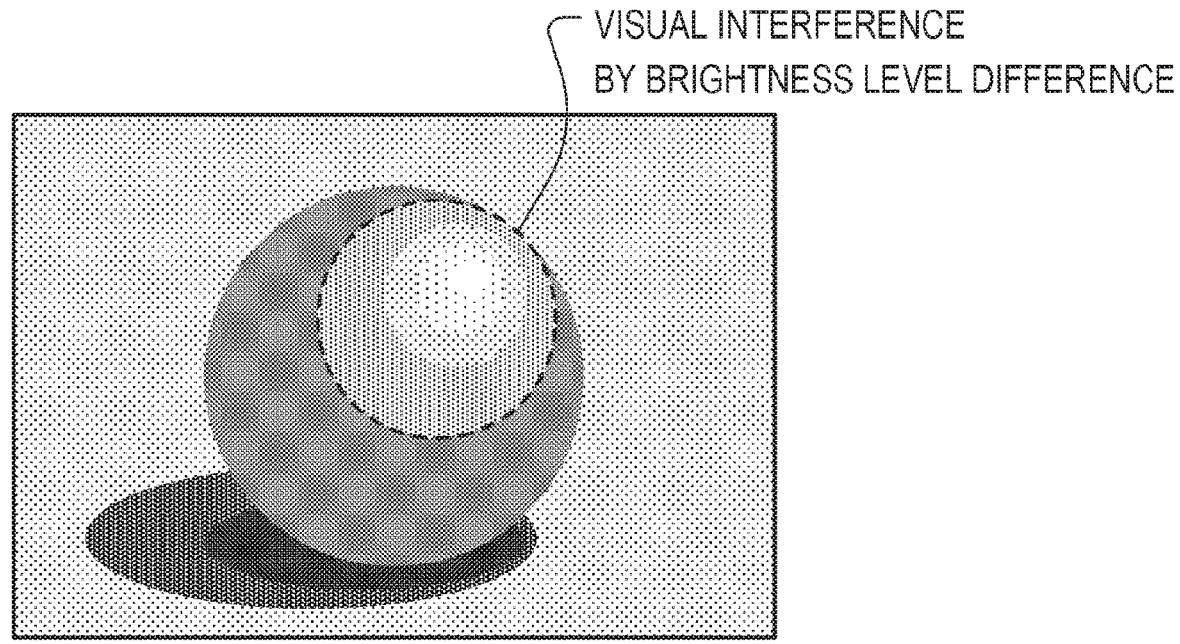

As another comparative example, a brightness characteristic 64, which includes a knee characteristic constituted by two linear characteristics, will be considered. If the brightness characteristic 64 is used, an image illustrated in FIG. 7D is displayed, for example. In this case, a general gradation of the input image data 1 can be easily determined based on the display image, and also a general brightness of the input image data 1 can be easily determined based on the display image. However, the display brightness changes discontinuously with respect to the change of the data brightness over the boundary of the linear range and the highlight range, which may generate visual interference, such as a brightness level difference. In this example, the display brightness continuously changes with respect to the change of the data brightness over the boundary of the linear range and the highlight range, hence visual interference is not generated. The generation of such a visual interference as a brightness level difference, however, may be allowed.

Figure 8:
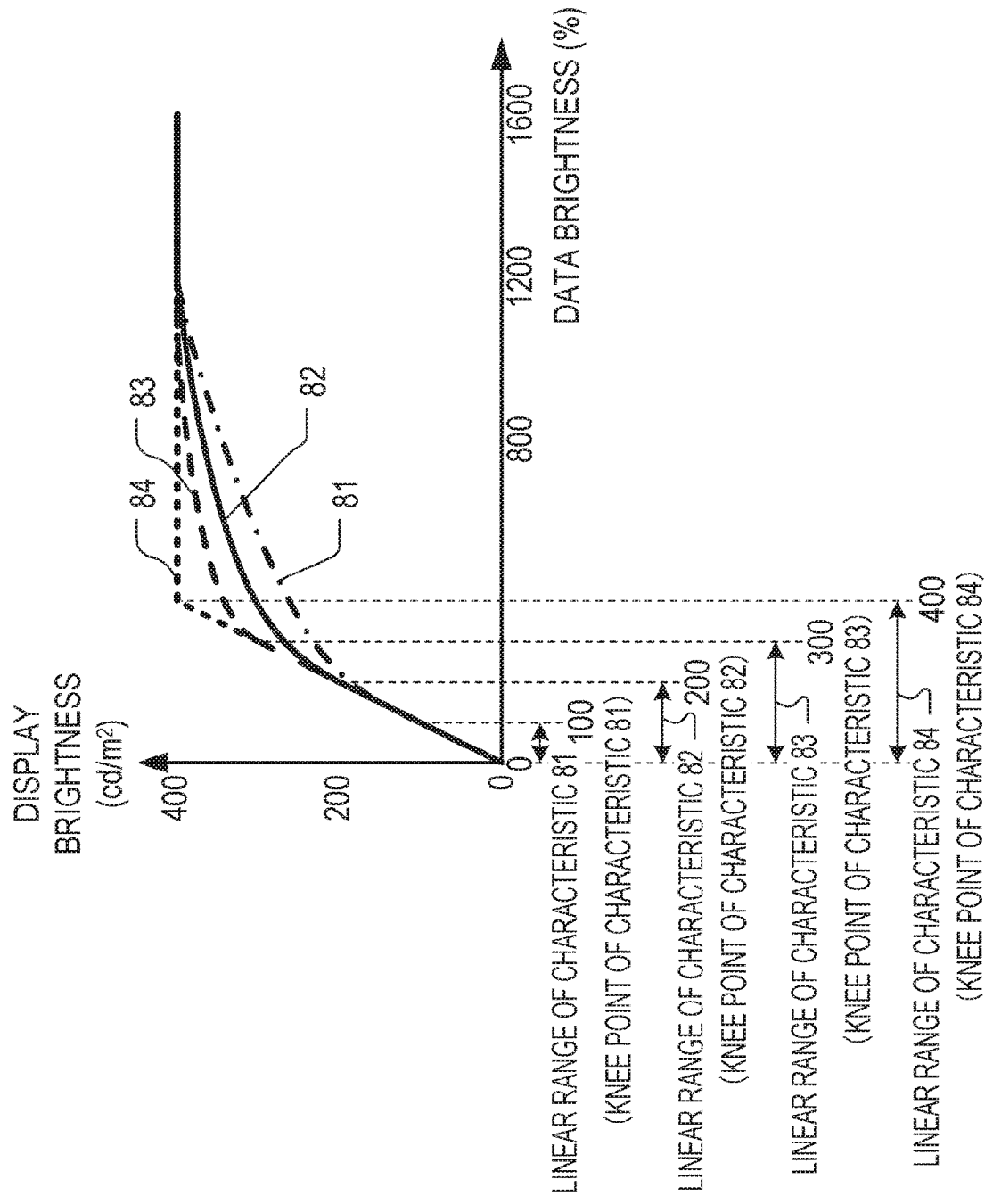
FIG. 8 is an example of a brightness characteristic according to Example 1.

FIG. 8 is an example of a change of the brightness characteristic with respect to the change of the knee point 22. FIG. 8 shows four brightness characteristics 81 to 84 which correspond to four knee points 22 of 100%, 200%, 300% and 400% respectively. As FIG. 8 shows, if the knee point 22 is decreased, the linear range decreases, and generally the display image becomes darker, but the range of the display brightness corresponding to the highlight range increases, and the gradation of the highlight portion of the display image improves. On the other hand, if the knee point 22 is increased, the range of the display brightness corresponding to the highlight range decreases, and the gradation of the highlight portion of the display image decreases, but the linear range increases and the general brightness of the display image and the like can be more accurately displayed.

In this example, the knee point 22 is adjusted (changed) and set in accordance with the user operation (e.g. user operation performed in accordance with the intended use of the display apparatus). However, the method of setting the knee point 22 is not limited to this. For example, in the display apparatus, the knee point 22 may be automatically adjusted and set in accordance with the operation mode of the display apparatus, the user environment of the display apparatus, and the type of input image data 1 (e.g. illustration, photograph, portrait, landscape, medical image). A fixed brightness predetermined by the manufacturer may be used as the knee point 22, but if the knee point 22 can be adjusted, a more desirable image for the user can be displayed.

The change of the brightness characteristic with respect to the change of the clip point 21 will be described. If the clip point 21 is decreased, the minimum data brightness that is displayed in overexposure decreases, and overexposure, which does not exist in the input image data 1, is more easily displayed, but the range of the display brightness corresponding to the highlight range relatively increases, and the gradation of the highlight portion of the display image improves. On the other hand, if the clip point 21 is increased, the range of the display brightness corresponding to the highlight range relatively decreases, and the gradation of the highlight portion of the display image is decreased, but the minimum data brightness that is displayed in overexposure increases, and overexposure which does not exist in the input image data 1 is rarely displayed.

In this example, the clip point 21 is adjusted (changed) and set in accordance with the user operation (e.g. user operation performed in accordance with the intended use of the display apparatus). However, the method of setting the clip point 21 is not limited to this. For example, in the display apparatus, the clip point 21 may be automatically adjusted and set in accordance with the operation mode of the display apparatus, the use environment of the display apparatus, the type of input image data 1 and the like. A fixed brightness predetermined by the manufacturer may be used as the clip point 21, but if the clip point 21 can be adjusted, a more desirable image for the user can be displayed.

Figure 9:
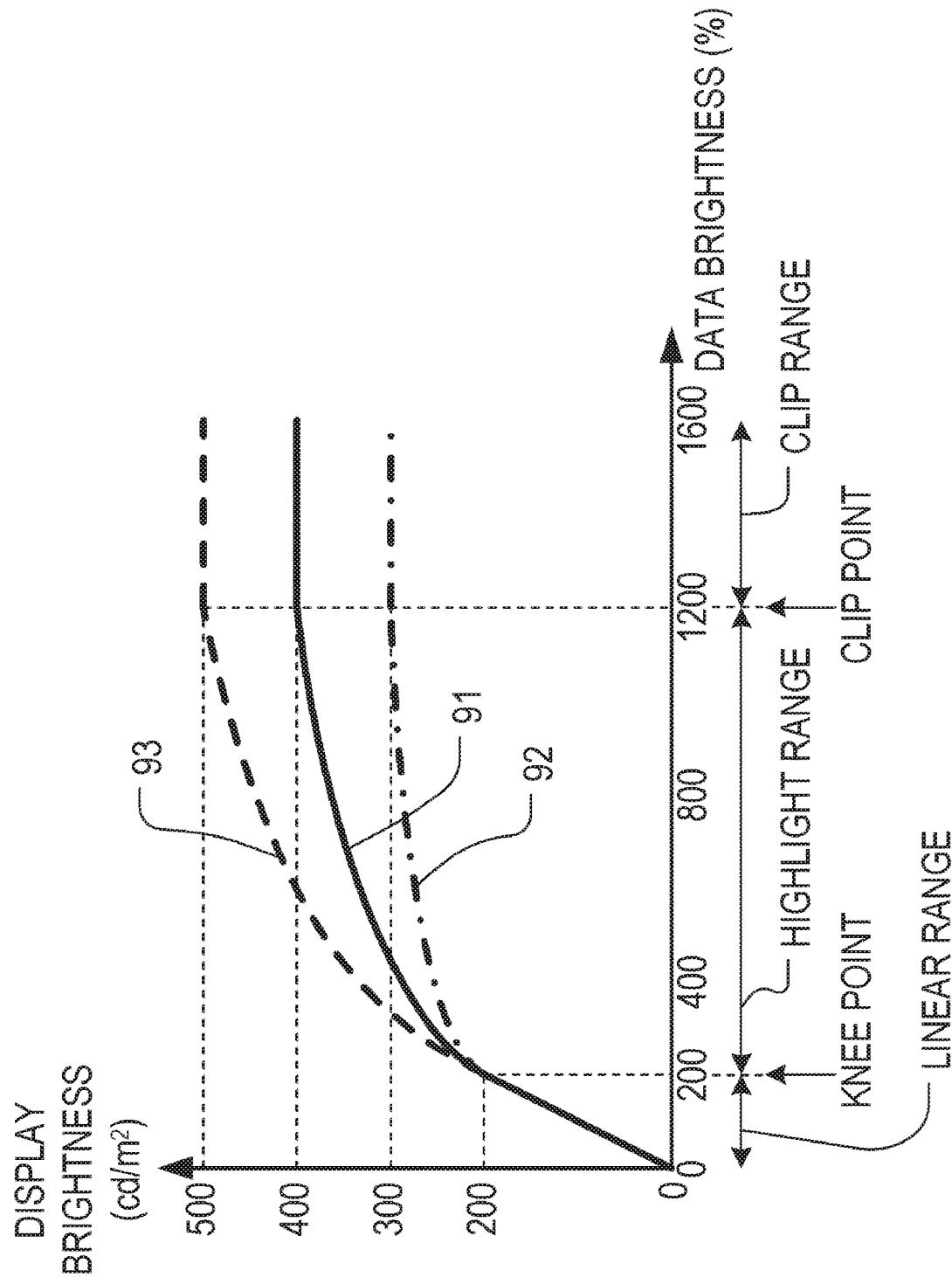
FIG. 9 is an example of a brightness characteristic according to Example 1.

FIG. 9 is an example of a change of the brightness characteristic with respect to the change of the maximum display brightness 24. The brightness characteristic 91 corresponds to the maximum display brightness 24=400 cd/m², and the brightness characteristic 92 corresponds to the maximum display brightness 24=300 cd/m². The clip point 21 of the brightness characteristic 91 and that of the brightness characteristic 92 are the same. The knee point 22 of the brightness characteristic 91 and that of the brightness characteristic 92 are also the same. As FIG. 9 shows, even if the maximum display brightness 24 changes, the brightness characteristic of the linear range does not change, and the general brightness of the display image hardly changes. Therefore, even if the maximum display brightness 24 is decreased due to a decrease in power consumption of the display apparatus, an image desirable for the user can be displayed.

In this example, the maximum display brightness 24 is adjusted (changed) and set in accordance with the user operation. However, the method of setting the maximum display brightness 24 is not limited to this. For example, in the display apparatus, the maximum display brightness 24 may be automatically adjusted and set in accordance with the operation mode of the display apparatus, the use environment of the display apparatus, and the type of the input image data 1 (e.g. illustration, photograph, portrait, landscape, medical image). In concrete terms, the lower maximum display brightness 24 may be set when a battery mode to drive the display apparatus by battery is set, compared with when the battery mode is not set. A fixed brightness (e.g. maximum apparatus brightness 51) predetermined by the manufacturer may be used as the maximum display brightness 24.

Figure 10:
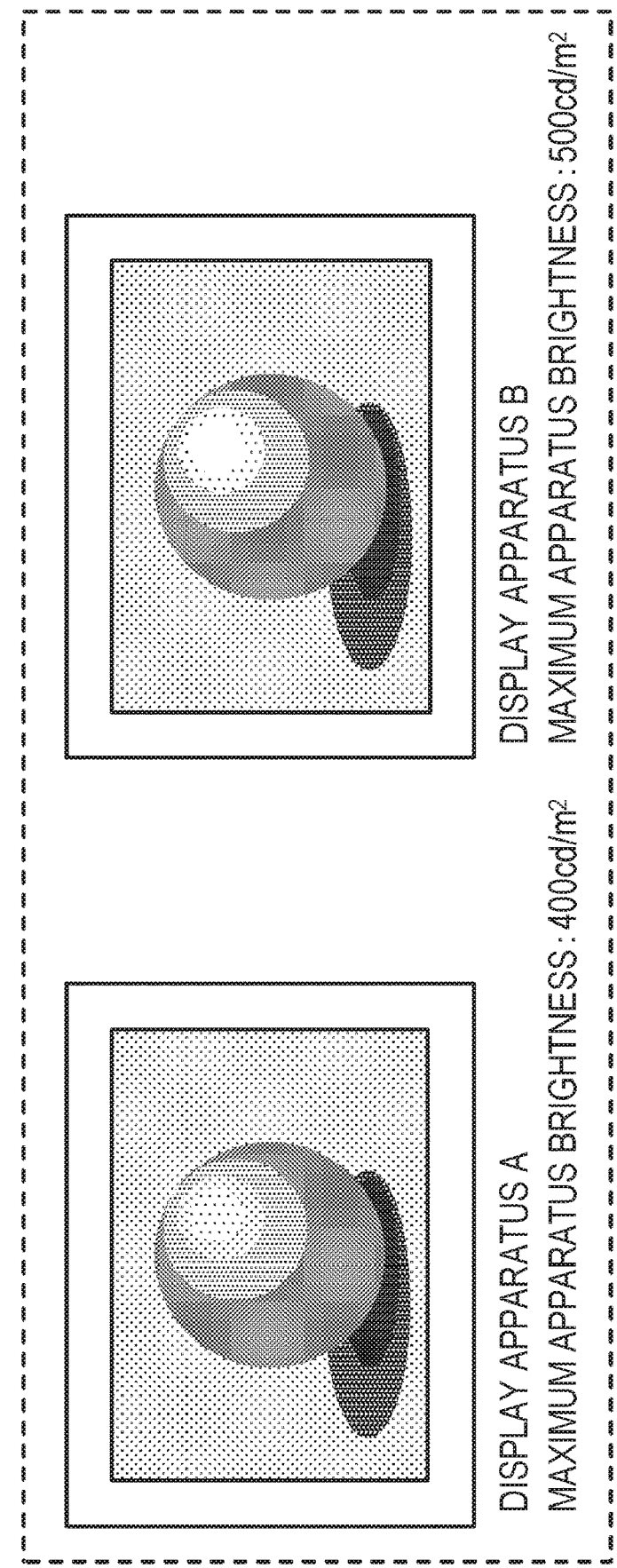
FIG. 10 is an example of two display apparatuses according to Example 1.
Figure 11:
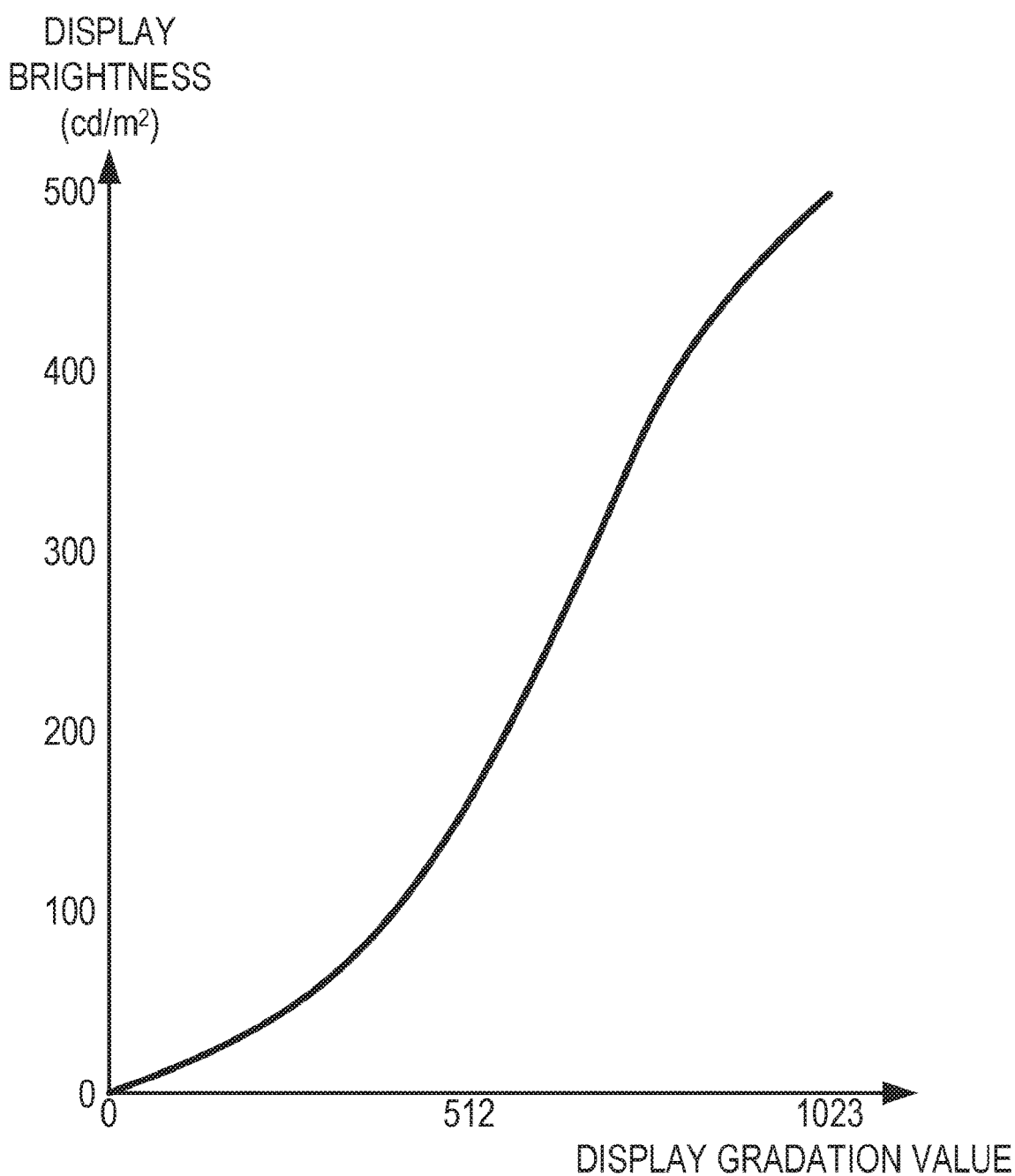
FIG. 11 is an example of a display gradation characteristic according to Example 1.

The configuration of this example is preferable when a plurality of images displayed on a plurality of display apparatuses having mutually different performances are checked and compared. FIG. 10 is an example when two display apparatuses A and B are used. The maximum apparatus brightness 51 of the display apparatus A is 400 cd/m$^2$, and the maximum apparatus brightness 51 of the display apparatus B is 500 cd/m$^2$. The display gradation characteristic of the display apparatus A is the display gradation characteristic in FIG. 5, and the display gradation characteristic of the display apparatus B is the display gradation characteristic in FIG. 11. Here a case when the clip point 21 of the display apparatus A and that of the display apparatus B are the same, and the knee point 22 of the brightness characteristic 91 and that of the brightness characteristic 92 are the same, will be considered. The input image data 1 of the display apparatus A and that of the display apparatus B may be different, but to simplify description, it is assumed that the input image data 1 of the display apparatus A and that of the display apparatus B are the same.

If the maximum display brightness 24 of the display apparatus A is 400 cd/m$^2$, the brightness characteristic 91 in FIG. 9 is acquired as the brightness characteristic of the display apparatus A. If the maximum display brightness 24 of the display apparatus B is 500 cd/m$^2$, the brightness characteristic 93 in FIG. 9 is acquired as the brightness characteristic of the display apparatus B.

In each display apparatus, the brightness characteristic based on the display gradation characteristic of this display apparatus is acquired. For example, the display characteristic of the display apparatus A is acquired based on the display gradation characteristic of the display apparatus A, and the display characteristic of the display apparatus B is acquired based on the display gradation characteristic of the display apparatus B. Therefore, even if the maximum display brightness is different among a plurality of display apparatuses, as in the case of the brightness characteristics 92 and 93, the brightness characteristics of the linear range match and the general brightness of the display images also approximately match, among the plurality of display apparatuses. In the highlight range of the input image data 1, the gradation compression is performed based on the maximum display brightness 24 of this display apparatus. As a result, in the display apparatus B, the range of the display brightness corresponding to the highlight range is wider than the display apparatus A, and the gradation of the highlight portion of the input image data 1 can be more easily checked than the display apparatus A.

In this way, even if a plurality of display apparatuses having mutually different performances are used, the brightness of the display image can be made to be consistent among the plurality of display apparatuses, and the highlight portion of the input image data 1 can be displayed at the maximum level of each apparatus.

As described above, according to this example, the input characteristic information is acquired and the characteristic of each range of the data brightness is determined based on this input characteristic information and the predetermined display characteristic information. In concrete terms, a linear characteristic, which increases monotonically, is implemented in the linear range, and a non-linear characteristic, which increases monotonically but more gently than the linear range, is implemented in the highlight range. Thereby a desirable image for the user can be displayed. For example, an image, in which the user can easily recognize the general gradation of the input image data, the general brightness of the input image data and the like, can be displayed.

The range of the data brightness that is at least the knee point and not more than the upper limit of the data brightness may be set as the highlight range without using the clip point, and the clip range need not be set. The upper limit of the data brightness may be used as the clip point.

The method of generating the gradation conversion table data, the method of converting the input gradation value and the like are not limited to the above mentioned methods. For example, instead of one gradation conversion table data, a plurality of LUTs, which correspond to a plurality of conversion types respectively, may be generated. The plurality of conversions are, for example, the conversion based on the input gradation characteristic (Expression 3), the conversion based on the Bezier curve (Expressions 6-1, 6-2), the conversion based on the display gradation characteristic (Expressions 2, 4, 8), and the like. The input gradation value may be converted into the display gradation value by performing the above mentioned computation (Expressions 2 to 4, 6-1, 6-2, 8) without generating an LUT of the gradation conversion table data.

As long as the conversion to implement the linear characteristic, which increases monotonically, in the linear range and to implement the non-linear characteristic, which increases monotonically but more gently than the linear range, in the highlight range, is included, conversion corresponding to another image processing may be included in the conversion of the input gradation value. Here it is assumed that the conversion to implement the linear characteristic, which increases monotonically, in the linear range, and to implement the non-linear characteristic, which increases monotonically but more gently than the linear range, in the highlight range, is a "first conversion", and the conversion corresponding to another image processing is a "second conversion". In the conversion of the input gradation value, the first conversion may or may not be divided and included. For example, an LUT corresponding to the second conversion may be included in the plurality of LUTs. One LUT may implement at least a part of the first conversion and at least a part of the second conversion. A computing for another image processing may be performed before or after the above mentioned computing, or a computing for another processing may be inserted among the above mentioned computing.

Example 2

Example 2 of the present invention will be described next. In this example, a case of adjusting the brightness characteristic of the highlight range in accordance with the user operation will be described. In the following, aspects (e.g. configuration, processing) that are different from Example 1 will be described in detail, and description on aspects that are the same as Example 1 will be omitted.

Figure 12:
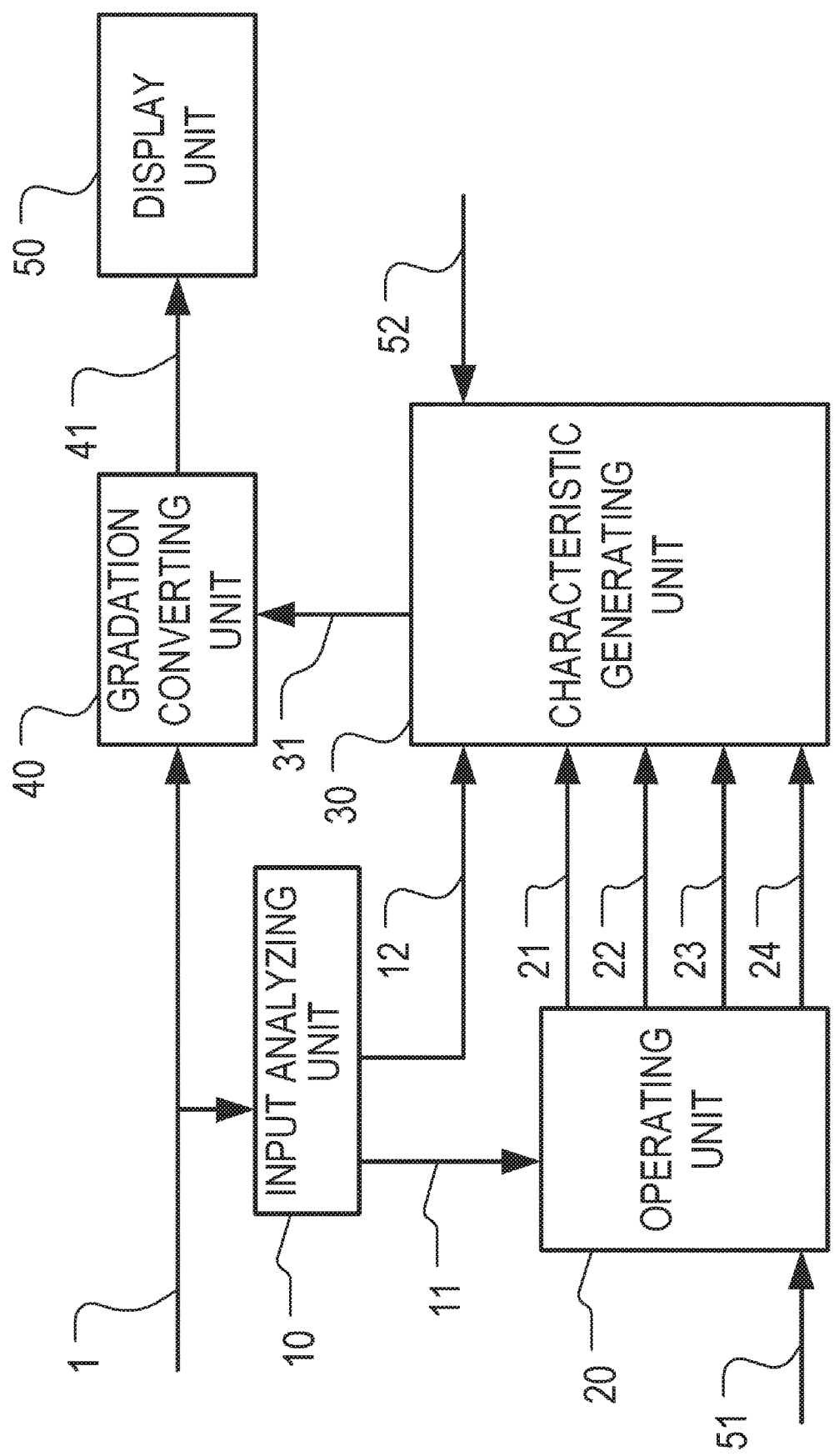
FIG. 12 is a block diagram depicting a configuration example of a display apparatus according to Example 2.

FIG. 12 is a block diagram depicting a configuration example of a display apparatus according to this example. In FIG. 12, a composing element the same as FIG. 1 (Example 1) is denoted with a same reference sign as that in FIG. 1.

The operating unit 20 of this example performs similar processing as the operating unit 20 of Example 1. In this example, an adjustment menu shown in FIG. 13 is displayed. Using the adjustment menu in FIG. 13, the user can specify a curve adjustment value 23, in addition to the clip point 21, the knee point 22 and the maximum display brightness 24. The operating unit 20 of this example sets the clip point 21, the knee point 22, the curve adjustment value 23 and the maximum display brightness 24, which were specified by the user, to the characteristic generating unit 30.

The characteristic generating unit 30 of this example performs similar processing as the characteristic generating unit 30 of Example 1. The characteristic generating unit 30 of this example also adjusts the brightness characteristic of the highlight range in accordance with the curve adjustment value 23. In concrete terms, the characteristic generating unit 30 of this example generates the gradation conversion table data 31, so that the brightness characteristic adjusted in accordance with the curve adjustment value 23 is implemented as the brightness characteristic in the highlight range.

The processing flow of the characteristic generating unit 30 of this example is the same as Example 1 (FIG. 4A to 4C). In S300 in FIG. 4A of this example, however, the characteristic generating unit 30 acquires the brightnesses C, K and DL and the value Cv which is the curve adjustment value 23, from the operating unit 20. Then in S320 in FIG. 4C of this example, the characteristic generating unit 30 sets the Bezier control point (K+(DL−K)×Cv/2, Xb) as the second Brezier control point (Xb, Yb).

Figure 14:
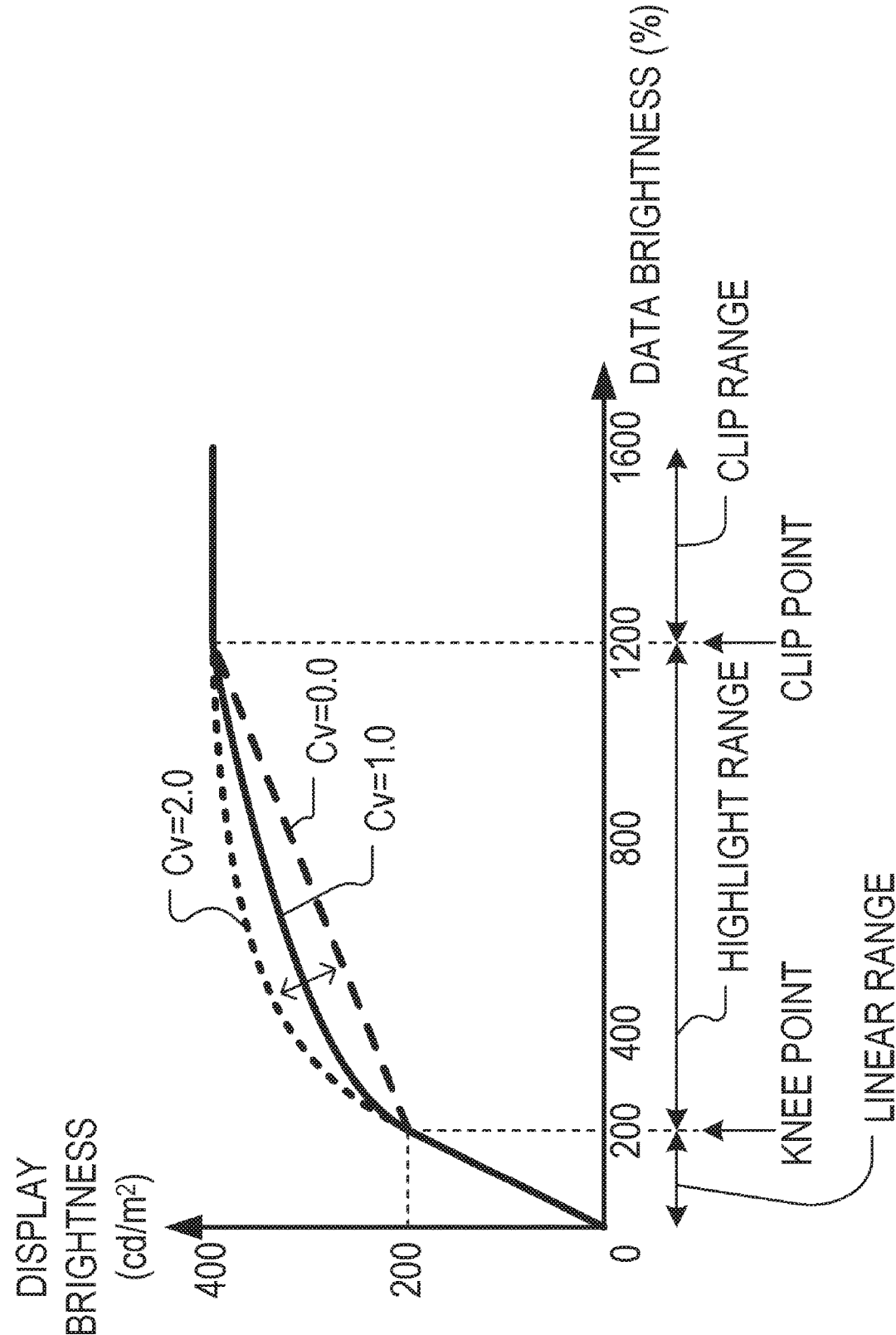
FIG. 14 is an example of a brightness characteristic according to Example 2.

FIG. 14 is an example of the change of the brightness characteristic with respect to the change of the curve adjustment value Cv. In this example, the curve adjustment value Cv is set to a value that is at least 0.0 and not more than 2.0. As FIG. 14 shows, by setting the curve adjustment value Cv to be closer to 0.0, the brightness characteristic of the highlight range can be closer to the linear characteristic in which the display brightness increases approximately linearly with the increase of the data brightness. Thereby the visibility in the highlight range can be improved. On the other hand, by setting the curve adjustment value Cv to be distant from 0.0 and closer to 2.0, then the brightness characteristic of the highlight range can be distant from the linear characteristic. Thereby the change of the brightness characteristic around the knee point can be gentle, which makes the display image look more natural. The range of the curve adjustment value Cv, the method of adjusting the brightness characteristic of the highlight range and the like are not especially limited.

As described above, according to this example, the brightness characteristic of the highlight range is adjusted in accordance with the user operation. Thereby a more desirable image can be displayed for the user. The display apparatus of this example is appropriate for a user who wants to adjust the display state more precisely even if operation is somewhat complicated.

Example 3

Example 3 of the present invention will be described next. In Example 1, a case of acquiring the Bezier curve as the curve of the brightness characteristic of the highlight range was described, but in this example, a case of determining the brightness characteristic of the highlight range using a simpler method will be described. In the following, aspects (e.g. configuration, processing) that are different from Example 1 will be described in detail, and description on aspects that are the same as Example 1 will be omitted.

Figure 15:
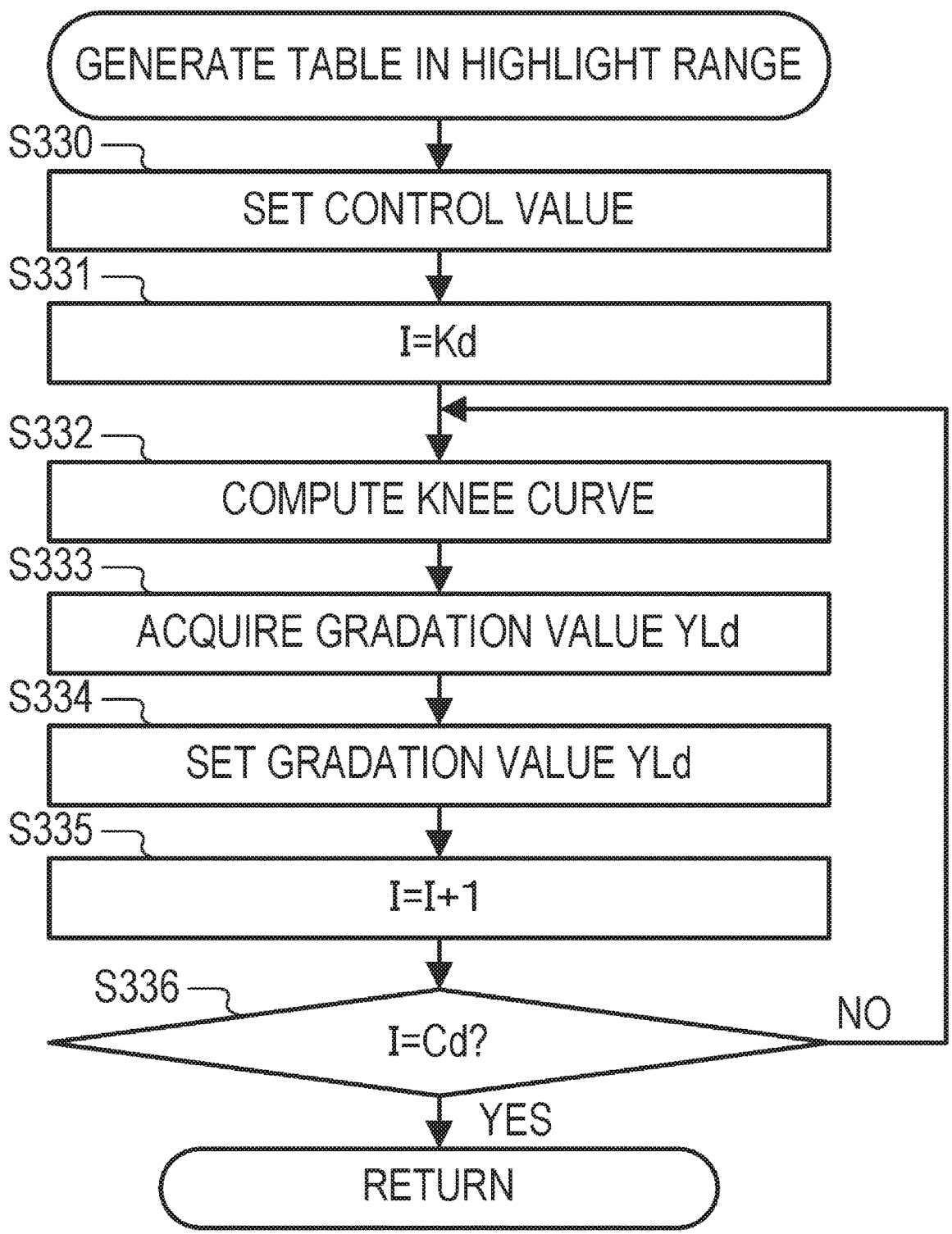
FIG. 15 is a flow chart depicting an example of a processing flow according to Example 3.

FIG. 15 is a flow chart depicting an example of a processing flow (generation of the gradation conversion table data 31 in the highlight range) that is executed in this example, instead of the processing flow in FIG. 4C.

First in S330, the characteristic generating unit 30 sets the control value (reference value) to generate a knee curve, which indicates the correspondence relationship between the data brightness and the display brightness. In this example, the following eight control values are set.

First control value: X0=K
Second control value: Y0=K
Third control value: Xm=(K+DL)/2
Fourth control value: Ym=(K+DL)/2
Fifth control value: X1=C
Sixth control value: Y1=DL
Seventh control value: Sm=(Y1−Ym)/(X1−Xm)
Eighth control value: Xs=X0+(Xm−X0)×2

Then in S331, the characteristic generating unit 30 initializes a loop variable I to Kd.

Then in S332, the characteristic generating unit 30 performs computing to generate the knee curve. In concrete terms, the display brightness Y corresponding to the input gradation value (loop variable) I is calculated using the following Expressions 10-1 to 10-3.

$$X=\text{EOTF}(I) \qquad \text{(Expression 10-1)}$$

If X<Xs, $$Y=X+((Sm-1)/2)\times(X-X0)^2/(Xs-X0) \qquad \text{(Expression 10-2)}$$

If X≥Xs, $$Y=(X-X1)\times Sm+Y1 \qquad \text{(Expression 10-3)}$$

Then in S333, based on the display brightness Y corresponding to the input gradation value I and the display characteristic information 52 (Table DTF (x2)), the characteristic generating unit 30 determines the display gradation value YLd corresponding to this display brightness Y, as shown in the following Expression 11.

$$YLd=\text{DTF}(Y) \qquad \text{(Expression 11)}$$

Then in S334, the characteristic generating unit 30 sets the display gradation value YLd in the gradation conversion table data 31. In concrete terms, the characteristic generating unit 30 sets the display gradation value Ld as the display gradation value LUT (I) corresponding to the input gradation value I, as shown in the following Expression 12.

$$\text{LUT}(I)=YLd \qquad \text{(Expression 12)}$$

Then in S335, the characteristic generating unit 30 updates the loop variable I to I=I+1.

Then in S336, the characteristic generating unit 30 determines whether or not the loop variable I=Cd. If the loop variable I=Cd, the processing flow (sub-routine) in FIG. 15 ends, and if not, the processing returns to S332. Instead of determining whether or not the loop variable I=Cd, whether or not the data brightness EOTF (I)=C may be determined.

Figure 16:
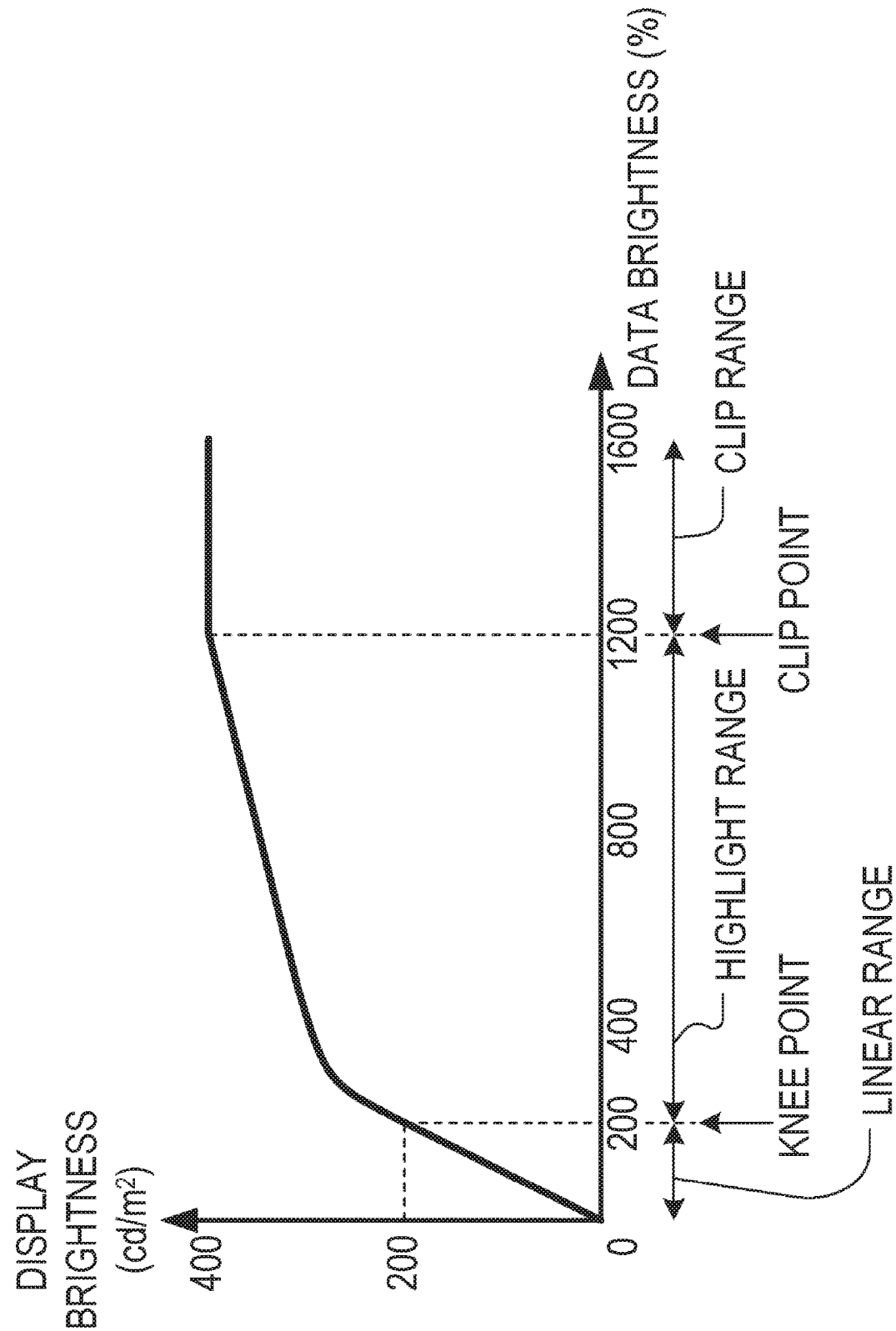
FIG. 16 is an example of a brightness characteristic according to Example 3.

FIG. 16 is an example of the brightness characteristic acquired by this example. As FIG. 16 shows, in this example, the highlight range is divided into a first range HR1, in which the display brightness non-linearly changes with respect to the change of the data brightness, and a second range HR2, in which the display brightness linearly changes with respect to the change of the data brightness, by the processing in S332 in FIG. 15. Thereby an image, of which shading in the highlight range is less natural compared with Example 1, is displayed, but the input image data can be converted into the display image data with processing simpler than Example 1 (with less processing load than Example 1). In concrete terms, in this example, the gradation conversion table data in the highlight range can be generated with processing simpler than Example 1. Therefore the display apparatus of this example is appropriate for use with simple requirements.

Each functional unit of Examples 1 to 3 may or may not be standalone hardware. The functions of at least two functional units may be implemented by common hardware. Each of a plurality of functions of one functional unit may be implemented by standalone hardware respectively. At least two functions of one functional unit may be implemented by common hardware. Each functional unit may or may not be implemented by hardware. For example, the apparatus may include a processor and a memory, in which control program is stored. Then the functions of at least a part of the functional units of the apparatus may be implemented by a processor reading the control program from memory and executing the program.

Examples 1 to 3 are merely examples, and configurations implemented by appropriately modifying or changing the configurations of Examples 1 to 3 within the scope of the essence of the present invention are included in the present invention. The configurations implemented by appropriately combining the configurations of Examples 1 to 3 are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-079349, filed on Apr. 13, 2017, which is hereby incorporated by reference herein in its entirety.

What is claimed is:

1. A display apparatus, comprising:
an acquiring unit configured to acquire characteristic information on a correspondence relationship between a gradation value of input image data and image brightness which is brightness of the input image data;
a converting unit configured to generate display image data by converting each gradation value of the input image data based on the characteristic information and a predetermined correspondence relationship between a gradation value of the display image data and display brightness on a screen; and
a displaying unit configured to display an image based on the display image data on the screen, wherein
the converting unit converts each gradation value of the input image data so that
in a first range which is a range in which image brightness is not more than a first brightness, a linear characteristic, in which the display brightness increases approximately linearly with the increase of the image brightness, is implemented,
in a second range which is a range in which image brightness is not less than the first brightness and not more than second brightness, a non-linear characteristic, in which the display brightness increases up to an upper limit with the increase of the image brightness more gently than in the linear characteristic in the first range, is implemented, and
in a third range which is a range in which image brightness is not less than the second brightness, a characteristic in which the upper limit of the display brightness corresponds to each image brightness, is implemented,
wherein the acquiring unit and the converting unit are implemented via at least one processor.

2. The display apparatus according to claim 1, wherein in the linear characteristic of the first range, the image brightness is approximately the same as the display brightness corresponding to this image brightness.

3. The display apparatus according to claim 1, further comprising a setting unit configured to set at least one of the first brightness and the upper limit of the display brightness,
wherein the acquiring unit, the converting unit, and the setting unit are implemented via the at least one processor.

4. The display apparatus according to claim 3, wherein the setting unit sets at least one of the first brightness and the upper limit of the display brightness in accordance with a user operation.

5. The display apparatus according to claim 1, wherein the characteristic of the second range is continuous to the linear characteristic of the first range.

6. The display apparatus according to claim 1, wherein a first derivation of the characteristic of the second range is continuous to a first derivation of the linear characteristic of the first range.

7. The display apparatus according to claim 1, further comprising a setting unit configured to set the second brightness,
wherein the acquiring unit, the converting unit, and the setting unit are implemented via the at least one processor.

8. The display apparatus according to claim 7, wherein the setting unit sets the second brightness in accordance with a user operation.

9. The display apparatus according to claim 1, wherein a curve indicating the correspondence relationship between the image brightness and the display brightness in the second range is a Bezier curve.

10. The display apparatus according to claim 1, further comprising an adjusting unit configured to adjust the characteristic of the second range in accordance with a user operation, wherein the acquiring unit, the converting unit, and the adjusting unit are implemented via the at least one processor.

11. The display apparatus according to claim 10, wherein the adjusting unit adjusts the characteristic of the second range to be closer to a linear characteristic, in which the display brightness increases approximately linearly with the increase of the image brightness, or to be distant from this linear characteristic.

12. The display apparatus according to claim 1, wherein the image brightness is expressed by a unit % of relative brightness.

13. The display apparatus according to claim 1, wherein the display brightness on the screen is expressed by a unit $cd/m^2$ of absolute brightness.

14. A control method of display apparatus configured to display an image based on display image data on a screen, the control method comprising:
acquiring characteristic information on a correspondence relationship between a gradation value of input image data and image brightness which is brightness of the input image data; and
generating the display image data by converting each gradation value of the input image data based on the characteristic information and a predetermined correspondence relationship between a gradation value of the display image data and display brightness on the screen, wherein
in the generating, each gradation value of the input image data is converted so that
in a first range which is a range in which image brightness is not more than a first brightness, a linear characteristic, in which the display brightness increases approximately linearly with the increase of the image brightness, is implemented, and
in a second range which is a range in which image brightness is not less than the first brightness and not more than second brightness, a non-linear characteristic, in which the display brightness increases up to an upper limit with the increase of the image brightness more gently than in the linear characteristic in the first range, is implemented, and
in a third range which is a range in which image brightness is not less than the second brightness, a characteristic in which the upper limit of the display brightness corresponds to each image brightness, is implemented.

15. An image processing apparatus, comprising:
an acquiring unit configured to acquire characteristic information on a correspondence relationship between a gradation value of input image data and image brightness which is brightness of the input image data; and
a converting unit configured to generate display image data by converting each gradation value of the input image data based on the characteristic information and a predetermined correspondence relationship between a gradation value of the display image data and display brightness on a screen, wherein
the converting unit converts each gradation value of the input image data so that
in a first range which is a range in which image brightness is not more than a first brightness, a linear characteristic, in which the display brightness increases approximately linearly with the increase of the image brightness, is implemented,
in a second range which is a range in which image brightness is not less than the first brightness and not more than second brightness, a non-linear characteristic, in which the display brightness increases up to an upper limit with the increase of the image brightness more gently than in the linear characteristic in the first range, is implemented, and
in a third range which is a range in which image brightness is not less than the second brightness, a characteristic in which the upper limit of the display brightness corresponds to each image brightness, is implemented,
wherein the acquiring unit and the converting unit are implemented via at least one processor.

* * * * *